United States Patent [19]

Hirsch et al.

[11] Patent Number: 5,586,039
[45] Date of Patent: Dec. 17, 1996

[54] COMPUTER-AIDED MANUFACTURING SUPPORT METHOD AND SYSTEM FOR SPECIFYING RELATIONSHIPS AND DEPENDENCIES BETWEEN PROCESS TYPE COMPONENTS

[75] Inventors: Judith S. Hirsch, Plano; Ulrich H. Wild, Dallas, both of Tex.

[73] Assignee: Texas Instruments Incorporated, Dallas, Tex.

[21] Appl. No.: 395,023

[22] Filed: Feb. 27, 1995

Related U.S. Application Data

[63] Continuation-in-part of Ser. No. 40,303, Mar. 29, 1993, abandoned.

[51] Int. Cl.⁶ .............................. G06F 19/00; G06F 17/60
[52] U.S. Cl. ................... 364/468.01; 364/474.24
[58] Field of Search .................... 364/140, 146, 364/188, 468, 474.24, 401

[56] References Cited

U.S. PATENT DOCUMENTS

| | | | |
|---|---|---|---|
| 4,862,376 | 8/1989 | Ferriter et al. | 364/468 |
| 4,887,207 | 12/1989 | Natarajan | 364/401 |
| 4,887,218 | 12/1989 | Natarajan | 364/468 |
| 5,050,088 | 9/1991 | Buckler et al. | 364/468 |
| 5,089,970 | 2/1992 | Lee et al. | 364/468 |
| 5,119,307 | 6/1992 | Blaha et al. | 364/468 |
| 5,208,765 | 5/1993 | Turnbull | 364/552 |
| 5,216,612 | 6/1993 | Cornett et al. | 364/468 |
| 5,231,585 | 7/1993 | Kobayashi et al. | 364/468 |
| 5,239,487 | 8/1993 | Horejsi et al. | 364/552 |
| 5,311,438 | 5/1994 | Sellers et al. | 364/468 |
| 5,369,570 | 11/1994 | Parad | 364/401 R |
| 5,463,555 | 10/1995 | Ward et al. | 364/468 |

*Primary Examiner*—Paul P. Gordon
*Attorney, Agent, or Firm*—Robert L. Troike; Leo N. Heiting; Richard L. Donaldson

[57] ABSTRACT

The present invention provides a method and system, for use with a computer integrated management system, to classify and serve as the data and information repository for a process or product specification and to classify groups of process resources. The Process Type method provides information to describe the outcome of a process. The organization describing a Process Type includes three basic components. The first component is an action. The action component describes what is to be done by the process. The second component is material. The material component describes the element upon which or with which the action described by the action component is performed. The third component is technology. The technology component describes the resource which performs the action described by the action component with or upon the material described by the material component. The resulting Process Type is then used to control a process or the generation of a product to achieve a desired result.

6 Claims, 14 Drawing Sheets

```
ACTION DISPLAY                  12c
┌────────┬──────┬────────────────────────────┐
│ CREATE │ EDIT │ DELETE │─12d
└────────┴──────┴────────────────────────────┘
12b
      NAME     ABBR.  COMMENT
12a   CLEANUP  CLN    A PROCESS USED TO REMOVE PARTICLES
      COAT     NONE   USED TO APPLY POSITIVE PHOTORESIST
      DEPOSIT  DEP    DEPOSITS A VARIETY OF MATERIALS ON A WAFER
      EPITAXY  NONE   NOT USED IN THIS FAB, WAFERS COME PREPARED
      IMPLANT  IMPL
      INSPECT  INS

12e─[CANCEL]                    12f─[HELP]
```

Fig. 12

```
ACTION CREATE & EDIT
                                          13a─[CLEAR]
      13b        13d      13c
   ACTION: [DEPOSIT]     ABBREVIATION: [DEP]
   COMMENT: [DEPOSITS A VARIETY OF MATERIALS ON A WAFER]

[APPLY]─13e  [CANCEL]─13f   13g─[HELP]
```

MATERIAL DISPLAY

14b — CREATE | EDIT — 14c | DELETE — 14d

14a —
| NAME | ABBR. | MELT DEG C | COMMENT |
|---|---|---|---|
| ALIMINUM | AL | | |
| BORON | | | |
| CADMIUM | | | |
| COPPER | Cu | | |
| OXIDE | O | | |
| PHOTORESIST | | | |

14e — CANCEL          14f — HELP

Fig. 15

MATERIAL CREATE & EDIT

15a — MATERIAL: ALUMINUM   15d   15b — SYMBOL: AL   15e — CLEAR   15c — MELT PT: 425°C

COMMENT: SOMEONE NEEDS TO CONFIRM THE MELTING POINT

APPLY — 15f   CANCEL — 15g          15h — HELP

Fig. 16

TECHNOLOGY DISPLAY

16b — CREATE | EDIT — 16c | DELETE — 16d

16a —
| NAME | EXPANDED NAME | COMMENT |
|---|---|---|
| CVD | CHEMICAL VAPOR DEPOSITION | |
| LPCVD | LOW PRESSURE CHEMICAL VAPOR DEPOSITION | |
| RIE | REACTIVE ION ETCH | |
| RTA | RAPID THERMAL ANNEAL | |
| RTP | RAPID THERMAL PROCESS | |
| VPE | VAPOR PHASE EPITAXY | |

16e — CANCEL          16f — HELP

GOAL DESCRIPTION CREATE & EDIT

| GOAL NAME |
|---|
| CONFORMALITY |
| DEP. RATE |
| RESISTIVITY |
| GRAIN SIZE |
| THICKNESS |
| UNIFORMITY |

| UoM |
|---|
| u/s |
| ohm/sq |

DEP. RATE — 19b
u/s — 19c
CLEAR — 19a
THICKNESS/DEP. TIME — 19d

| ARITH. OPERATIONS | |
|---|---|
| + | ADDITION |
| − | SUBSTRACTION |
| * | MULTIPLICATION |
| / | DIVISION |
| ** | EXPONENT. |
| ( | ORDER OF EVAL. |
| ) | ORDER OF EVAL. |

| ARITH. FUNCTIONS | |
|---|---|
| MIN | MINIMUM |
| MAX | MAXIMUM |
| SUM | SUMMATION |
| SQRT | SQ. ROOT |
| AVG | AVERAGE |

19e, 19f, 19g

APPLY — 19h  CANCEL — 19i  HELP — 19j

Fig. 19

COMPUTER-AIDED MANUFACTURING SUPPORT METHOD AND SYSTEM FOR SPECIFYING RELATIONSHIPS AND DEPENDENCIES BETWEEN PROCESS TYPE COMPONENTS

This invention was made with Government support under Contract No. F33615-88-C-544B awarded by the Defense Advanced Projects Research Agency (DARPA)/ U.S. Air Force Wright Patterson Air Force Base and administered by U.S. Air Force. The Government has certain rights in this invention.

This application is a continuation-in-part of patent application Ser. No. 08/040,303, filed Mar. 29, 1993 now abandoned.

The present application incorporates by reference herein the following pending U.S. applications: TI-17915, patent application Ser. No. 08/038,577, filed Mar. 29, 1993 pending, entitled "A Method and Apparatus for Generating a Sequence of Steps for Use By a Factory"; and TI-17916, patent application Ser. No. 08/039,719, filed Mar. 29, 1993 now abandoned, entitled "An Apparatus and Method for Effecting a Change Notice".

TECHNICAL FIELD OF THE INVENTION

The present invention relates to process engineering systems and more particularly to an information repository based infrastructure used to support process engineering and manufacturing application software systems.

BACKGROUND OF THE INVENTION

In current manufacturing processes, many products are built and shipped to exacting specifications. Because of this, every operation that affects a product is specified in detail. Each process specification may be related to a specific machine or to a specific type of machine. The manufacturing process consists of many processes requiring large amounts of related information and can become very large in most manufacturing facilities, resulting in inconsistent or conflicting specifications.

Each product within a manufacturing facility must follow a specified routing through the manufacturing process. Each specification for processing, either a step or a sequence of steps, must be well-defined and unambiguous to assure the correct equipment selection and processing. Generally, defining the processing for any product is accomplished through a process definition or process specification application.

Historically, process specifications have consisted of instructions for operating manufacturing equipment to achieve the desired processing effect. The desired effects include depositing a specific amount of material on a surface within certain constraints such as deposition rate and uniformity, or removing a specified material selectively. This consisted of a knowledgeable process engineer specifying how to manipulate the various controls on specific machines, covering anything from the number of stitches for one specific sewing machine to the atmospheric pressure on a machine which controls a chemical reaction.

A better and less error prone method is to specify the effect of the process on the product without having to describe the details of how the effect is to be achieved. This can only be accomplished if all of the application software in a Computer Integrated Manufacturing (CIM) system are supported by a unified information repository containing all information related to the manufacturing environment. This repository must provide different views for the various applications such as schedulers, line load balancers, and process controllers.

Thus, what is needed is an information repository infrastructure which allows all process specification and manufacturing software applications to make use of a library of manufacturing components available for a given manufacturing environment to create consistent, unambiguous specifications and to facilitate selection of processing equipment at the time the process is performed.

SUMMARY OF THE INVENTION

It is an object of the present invention to simplify the creation and maintenance of process and product specifications and to ensure the proper equipment selection to achieve the desired process and product results. To meet this goal, the present invention provides a method and system for defining the process and product specifications as a managed set of interrelated manufacturing components, which include materials, actions, technologies, equipment, and goals which are available in the manufacturing environment. Data describing the managed set of manufacturing components is stored in an information repository and made available to all Computer Integrated Manufacturing (CIM) software applications and embedded equipment control software. Thus, it is another object of the present invention to ensure consistent representation of relationships and dependencies between the managed manufacturing components.

A Process Type identifies a set of the interrelated atomic components needed to describe the manufacturing process or product and to ensure that the process is executable or that the product is manufacturable in the manufacturing environment. An atomic component is the lowest level component which can tie described and still have meaning as a component. Provisions, however, are also made to allow for the specification of inexecutable processes. The user will be warned that there are missing resources for the process being specified. This allows the user to prepare for new equipment or facility installations while waiting for delivery and installation of the equipment, chemicals, or other resources. These inexecutable specifications are not made available to CIM software manufacturing applications or embedded equipment control software which are in a 'productive' state to prevent mis-processing due to invalid or incomplete specifications.

Thus, the Process Type is used to form a supporting information source for creating process specifications and affecting equipment selection and execution. A semiconductor wafer fabrication facility is used to demonstrate the present invention but it is contemplated that the present invention may be used in other environments such as automotive manufacturing.

A semiconductor wafer fabrication process includes many general types of actions, such as implant, deposition, lithography, etch, etc. For each action, there are various types of equipment, each of which may accomplish similar results but use a different technology. Because the actions are broad in scope, a more detailed definition or differentiation using the relationships and dependencies of the various components is devised.

The Process Type specification provides information to describe atomic components and their relationships which are required to support a manufacturing process step. The structure for describing the Process Type includes three basic components. The first is an action component. The action component describes the process step, such as depositing material on a wafer given certain constraints. The second is a material component. The material component describes the material, such as aluminum, used or acted upon when the action component is performed. The material component also describes a number of variables used to retain information such as chemical symbol of the material and melting temperature. The third component, technology, is used to provide a description of the available technologies for performing the action on or using the given material. Examples of the available technologies in semiconductor wafer fabrication include chemical vapor deposition and plasma-enhanced chemical vapor deposition.

Selecting the correct technology and the machine capable of performing the process is critical in most manufacturing steps. Thus, queries on available process types are used to support the CIM software applications making the equipment selection decisions. Since all applications make use of the same data and information repository, using different views, making equipment selection decisions and deriving equipment settings using the process types are based on consistent and available manufacturing components and resources.

The Process Type of the present invention, within a CIM system, describes all available manufacturing components, including resources, and serves as the data and information source for process step and sequence specifications. The explicit and implicit relationships of the components are used to support various queries from other CIM applications to support their data and information needs. The benefit to using relationships is the generation of an organization of data/information which allows rapid data access for different views.

A CIM system using the present invention has been designed to route material to a machine based, among other factors, on the Process Type described in the specifications. Each machine can perform one or more of the Process Types. A query to the Process Type application requesting all machines capable of the process type will return a list of machines available. This does not mean an explicit grouping, but an implicit grouping based on the components relationships. Another application may make use of the implicit grouping to establish explicit groups based on the process type data in the information repository.

An additional manufacturing component associated with the process type is one or more data sampling plans. A data sampling plan is used to describe what data is to be collected and when measurements are to be performed.

Graphical user interfaces (GUIs) are available in addition to the application interfaces to simplify the component description, assure consistency, and assist with the isolation of possibly meaningless relationships.

These and other features of the invention that will be apparent to those skilled in the art from the following detailed description of the invention, taken together with the accompanying drawings.

BRIEF DESCRIPTION OF THE DRAWINGS

FIG. 12 shows an exemplary Action Display GUI which shows a more detailed description of the action components;

FIG. 13 is an exemplary Action Create & Edit GUI available to create or edit action component descriptions;

FIG. 14 shows an exemplary Material Display GUI which shows a more detailed description of the material components;

FIG. 15 is an exemplary Material Create & Edit GUI available to create or edit material component descriptions;

FIG. 16 shows an exemplary Technology Display GUI which shows a more detailed description of the technology components;

FIG. 19 is an exemplary Goal Description Create & Edit GUI available to create or edit goal/constraint component descriptions;

DETAILED DESCRIPTION OF THE INVENTION

The Process Type used in the method and system of the present invention provides information to describe the desired outcome of a process. The organization for describing a Process Type includes three basic components. The first component is referred to as action. This term describes the overall purposes of the process. The second component is material. The material component describes the material and associated information used during the process. The third component is technology. To achieve a specific effect, there are many techniques or technologies available. Each technique or technology has its advantages, disadvantages and limitations where they can be used. The technology component specifies the particular method for achieving the desired result. The Process Type, which includes an action/material technology or an action/material component combination, is then provided to a computer-aided process engineering system which is operable to control a machine to perform the described process or generate the described product in accordance with the information within the Process Type.

The Process Type of the present invention, for example, has a purpose within a Computer Integrated Manufacturing (CIM) system to classify and to sere as the infrastructure and data repository for a step and sequence specification, and to create dynamic groups of process resources. CIM applications using the present invention have been designed, for example, to route product to a machine based on the specifications of that product within the Process Type. In order to identify the proper resource, the CIM application is operable to form a query inquiring from a group of resources which processes it can perform. Each resource can perform one or more of the processes described by one or more Process Types. Scheduler systems must determine which processes can actually be performed as specified, i.e., the scheduler system determines which of the resources that are capable of performing one or more of the processes actually has the time to perform the process in light of other tasks which may have already been assigned to that particular resource. A resource may be capable of performing many different processes and a selected resource may require a special equipment configuration. Resources may be grouped by their Process Types. These groups are known as process resource groups. Thus, the task of searching for a proper resource is manageable.

Figure 1A:
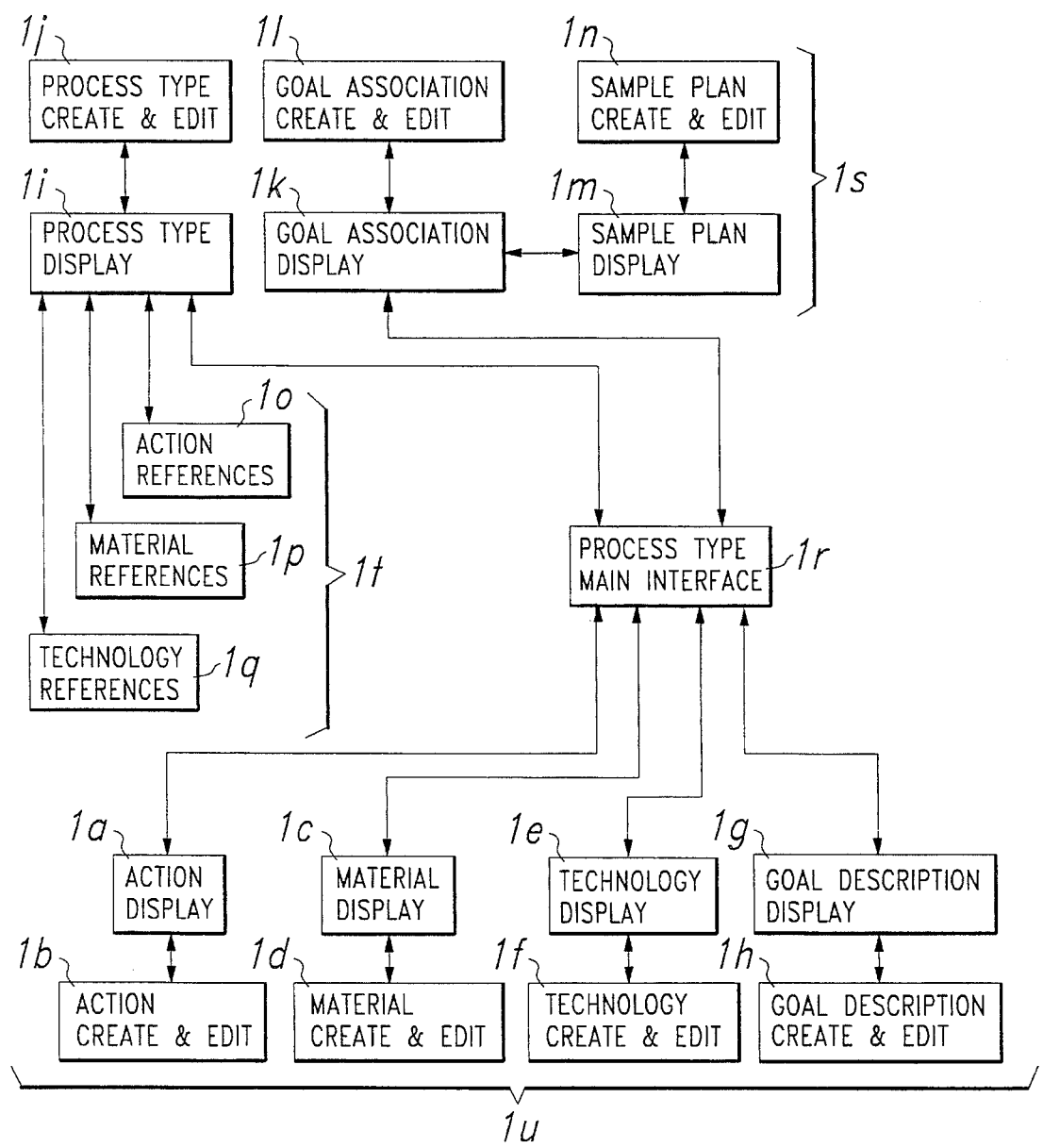
FIG. 1A is a block diagram showing one embodiment of the present invention in terms of its Graphical User Interfaces (GUIs)

One embodiment of the present invention, as illustrated in FIG. 1A includes a collection of graphical user interfaces (GUIs), shown in more detail in FIGS. 2–19 and described in more detail hereinbelow, which allow the user to define the manufacturing components available in a given manufacturing environment and then to define Process Types which associate certain ones of the defined manufacturing components to achieve a desired product or process result. The manufacturing component includes actions, materials, and technologies. In addition, the user may associate goals with each of the various manufacturing components associated by the Process Type and specify one or more Data Sampling Plans which describe when and how to collect data. The GUIs shown are intended to illustrate the basic concepts of the present invention and it is contemplated that other implementations of the GUIs could be generated to achieve similar results.

Figure 1B:
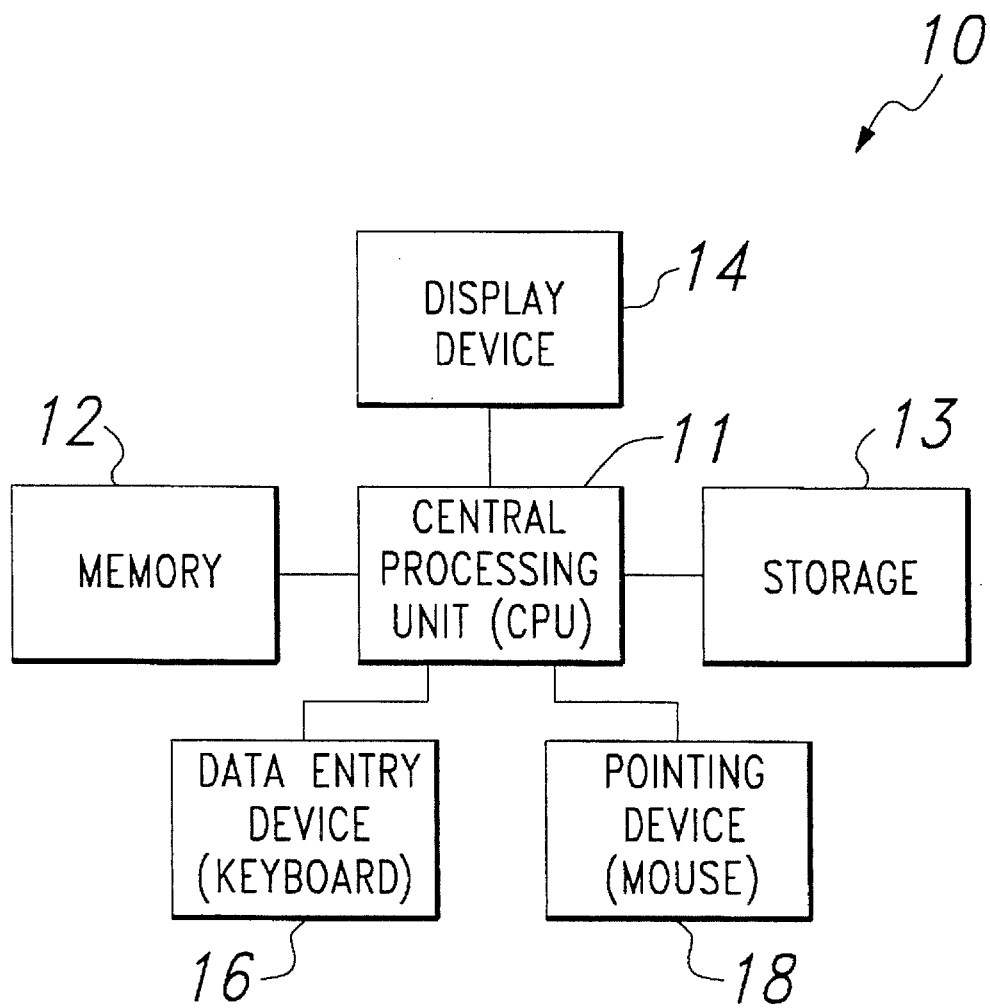
FIG. 1B is a block diagram of an exemplary computer used in implementing one embodiment of the present invention.

The current embodiment of the present invention is implemented, as shown in FIG. 1B, on a computer 10 which includes a central processing unit (CPU) 11, at least one memory device [12], and at least one storage device 13. The computer 10 further includes a display device 14, a data entry device 16 (such as a keyboard), a pointing device 18 (such as a mouse) and an operating system, such as Unix, executing on CPU 11. It is contemplated, however, that other computer hardware and operating system software may be used.

The current embodiment of the present invention is implemented using smalltalk, an object-oriented programming language, but it is further contemplated that other programming languages may be used.

The GUIs, FIGS. 2–19, used in the current embodiment of the present invention are generally list driven to provide the user a selection from existing elements. This encourages consistent naming of the elements and simplifies creation of Process Type descriptions and association of goals to the Process Types. Each of the GUIs in FIGS. 2–19 include a Cancel button 2h, 3j, 4h, 5e, 6e, 7e, 8j, 9f, 10h, 11m, 12e, 13f, 14e, 15g, 16e, 17e, 18e, or 19i which allows the user to abort the current activity and return to the previous GUI or exit the system. Each of the GUIs in FIG. 2–19 also include a help button 2i, 3k, 4i, 5f, 6f, 7f, 8k, 9g, 10i, 11n, 12f, 13g, 14f, 15h, 16f, 17f, 18f, or 19j which provides information to assist the user and to explain the use of each GUI.

Returning to FIG. 1A, which shows an overview of the GUIs in FIGS. 2–19, three major areas are shown (1s, 1t and 1u), each with its own set of GUIs designed to support a specific activity. The three major areas (1s, 1t, and 1u) are accessible from the Process Type Main Interface GUI 1r, illustrated in more detail in FIG. 2 and described in further detail hereinbelow, and include Atomic Process Type Component Support GUIs 1a–1h, Process Type Management Activity GUIs 1i and 1j, Goal Association and Sample Plan GUIs 1k–1m and Process Type Quick Reference GUIs 1o–1q.

The Atomic Process Type Component Support GUIs 1u are designed to display and create/edit atomic process type component information. The components of the Process Type include an Action, a Material, a Technology, and associated Goals. In the current embodiment of the present invention each atomic manufacturing component is supported by two GUIs. One is a display which shows a list of manufacturing components currently available in the library, while the other is used to create and edit the components.

The Process Type Management Activity GUIs 1i and 1j are designed to support and describe the various associations between atomic components which make up a manufacturing process type and provide a user with sufficient authorization a mechanism to view, create, change, and delete the information needed to describe a process type.

A process type is described in terms of the action performed, material involved, and technology used. If the user does not specify a technology, i.e., if the user does not specify that a particular machine is to be used to accomplish the task, then the CIM system applications executing the process or producing the product described by the Process Type will select a technology based on the action, material, and goals specified. This selection is made at the time the process step is performed and the factory capabilities are taken into consideration.

A valid process type description consists of an action/material pair, allowing the CIM applications to select the technology at processing time, or an action/material/technology combination. The user defines and edits these combinations using the GUIs Process Type Display 1i and Process Type Create & Edit 1j.

Figure 3:
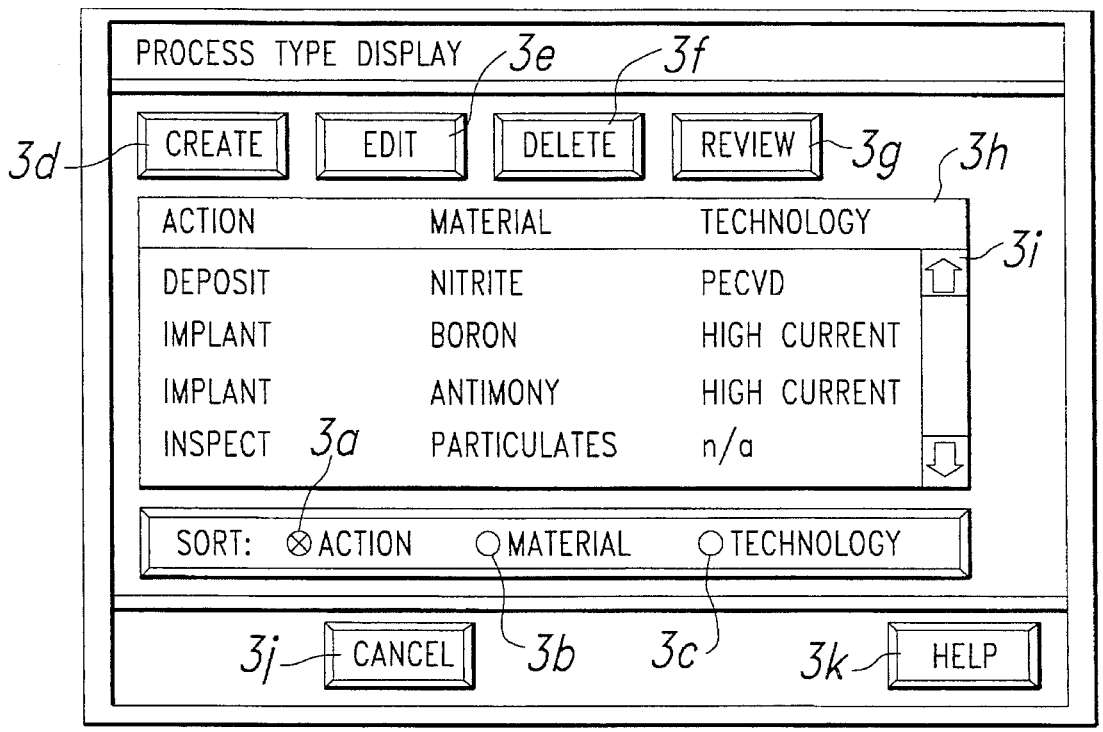
FIG. 3 shows an exemplary Process Type Display GUI.

The Process Type Display GUI 1i, shown in more detail in FIG. 3, supports the following operations:

a. Create a new process type description b. Edit an existing process type description c. Delete an existing process type description d. Cancel the current user interface activity e. Review the current process type quick references f. Sort by Action, Material, or Technology The Process Type Create & Edit GUI 1j, shown in more detail in FIG. 4, supports the following options:

a. Apply the currently shown input field information b. Cancel the current user interface activity The Goal Association and Sample Plan GUIs 1k through 1n support Goal and Data collection management. Multiple goals (measurable or derived), discussed in more detail herein below, may be associated with each process type. These goals form the foundation for selection of data sampling plans which are applicable to a process type. There are four GUIs which support the goal association and data sampling plan definitions.

Figure 8:
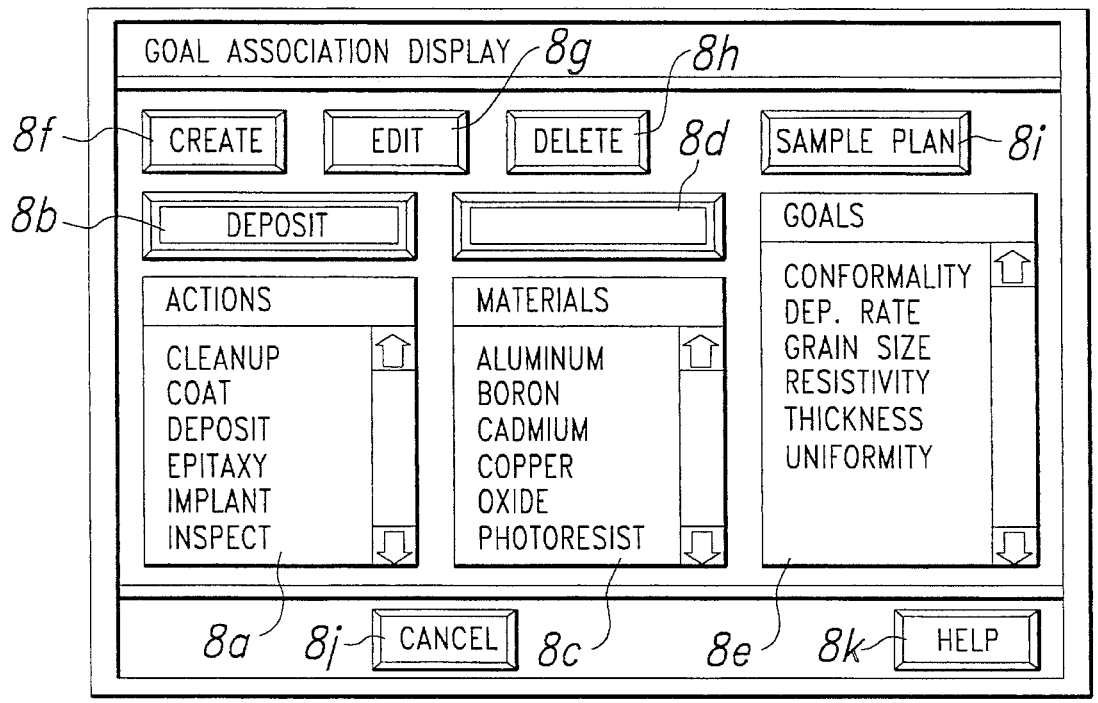
FIG. 8 is an exemplary Goal Association Display GUI allowing selection of goals (constraints) for a desired material/action pair.
Figure 9:
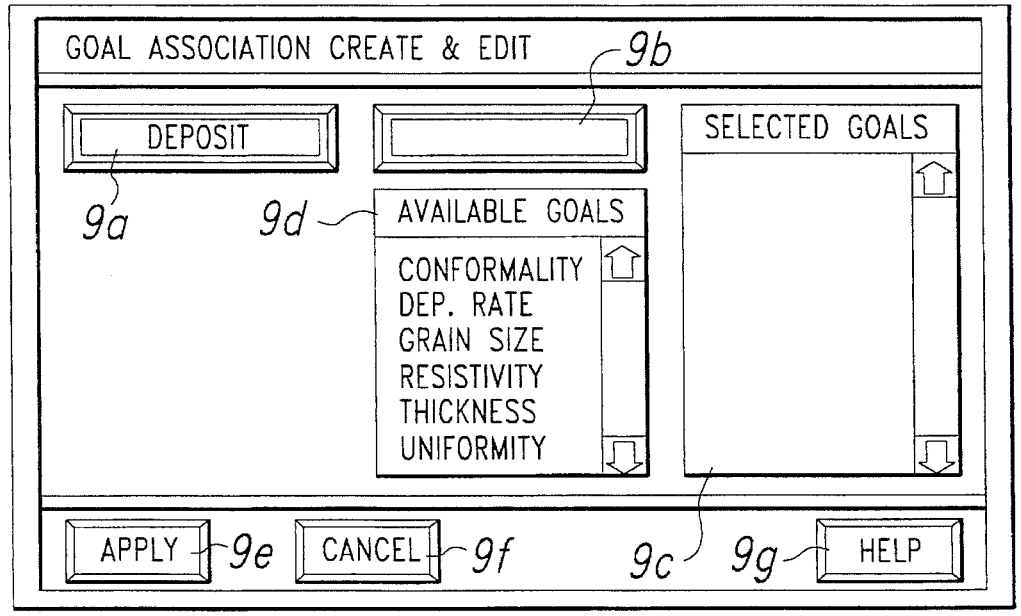
FIG. 9 shows an exemplary Goal Association Create & Edit GUI available to create or edit goals (constraints)

The Goal Association Display GUI 1k, shown in more detail in FIG. 8, supports the following operations:

a. Create a new process type to goal association b. Edit an existing process type to goal association c. Delete an existing process type to goal association d. Cancel the current user interface activity e. Define a data sampling plan The Goal Association Create & Edit GUI 1l, illustrated in more detail in FIG. 9, provides the user with the following operations:

a. Apply the currently displayed information b. Cancel the current user interface activity The Sample Plan Display GUI 1m, shown in more detail in FIG. 10 and described hereinbelow, is available to show all data sampling plans available for the selected goal. The following operations are supported:

a. Create a new data sampling plan description b. Edit an existing data sampling plan description c. Delete an existing data sampling plan description d. Cancel the current user interface activity The Sample Plan Create & Edit GUI 1n, shown in more detail in FIG. 11 and described hereinbelow, is used to specify the parameter values required to describe a data sampling plan. The data sampling plan is associated with a single goal and the Sample Plan Create & Edit GUI 1n provides the following operations:

a. Clear the information from all input fields b. Apply the currently displayed information c. Cancel the current user interface activity The Process Type Quick Reference GUIs 1o–1q, aid the user in the rapid isolation of inconsistent associations (e.g. Tin is used as a material for an implant action) by displaying all components referenced by a single process type component. For example: display all Materials and Technologies applicable to the selected Action.

Figure 5:
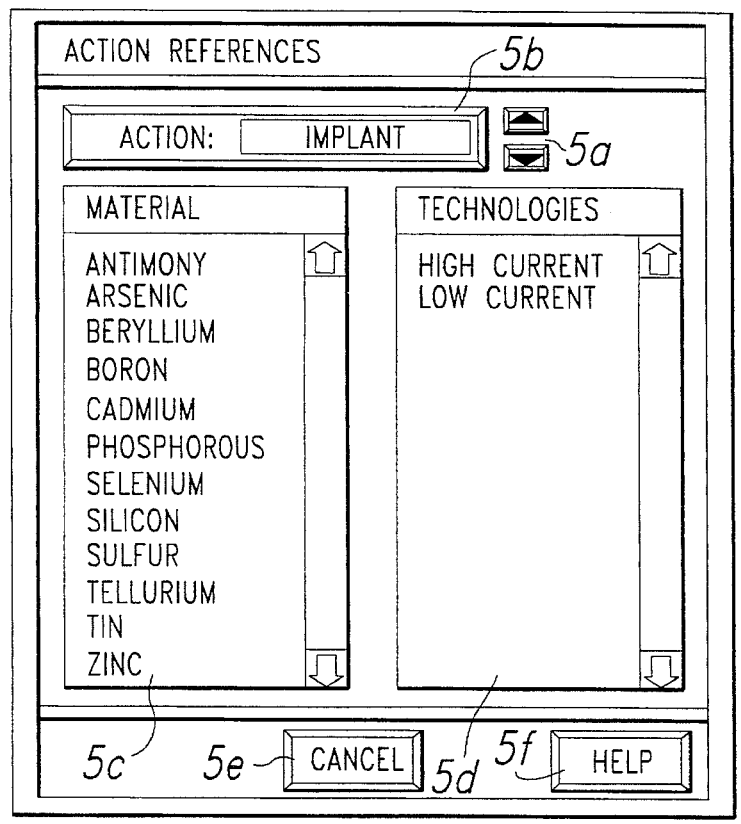
FIG. 5 is an exemplary Action References GUI showing available materials and technologies for a selected action.
Figure 6:
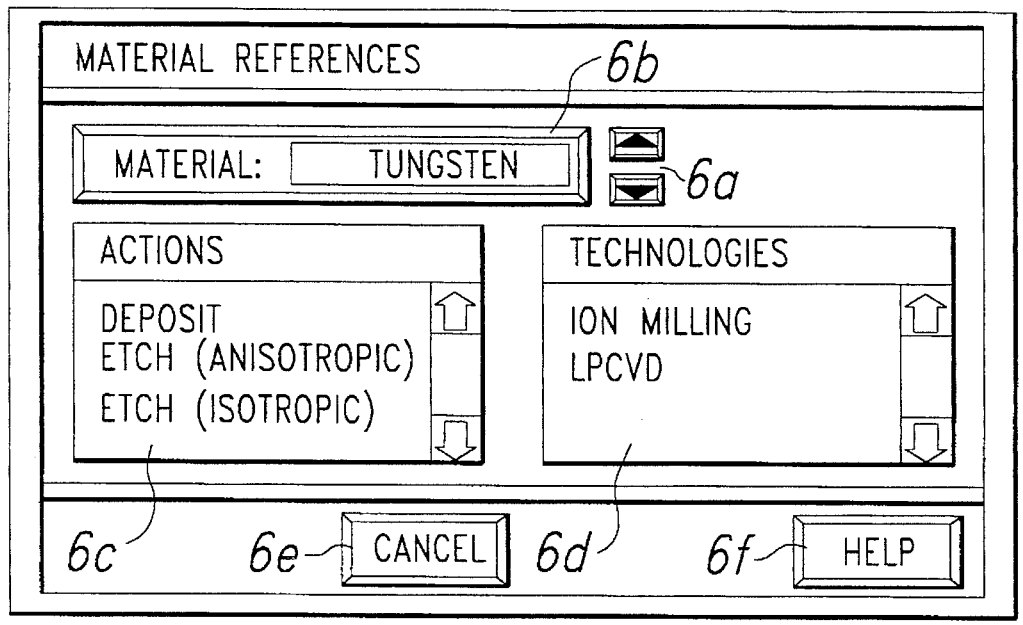
FIG. 6 is an exemplary Material References GUI showing available actions and technologies for a selected material.
Figure 7:
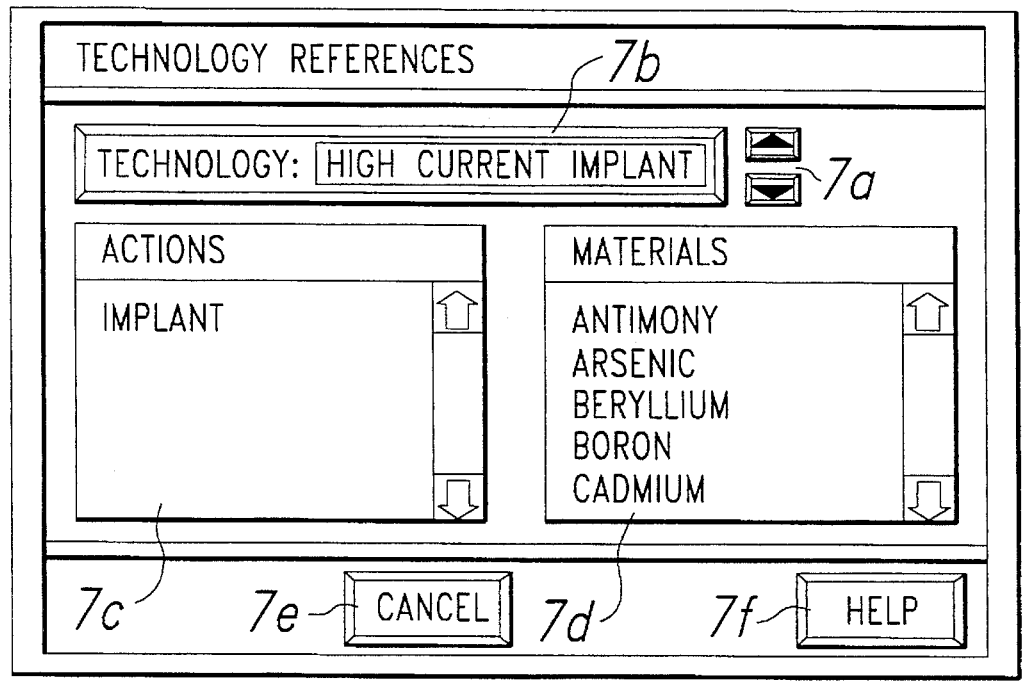
FIG. 7 depicts an exemplary Technology References GUI showing available actions and materials for a selected technology.

The Process Type Quick Reference GUIs, illustrated in more detail in FIGS. 5–7, are designed to give the user a quick view of the process type components applicable to the selected atomic component (e.g. action, material, or technology). The motivation for these displays is to aid the user in locating errors and inconsistencies quickly. For example, by reviewing all materials and technologies applicable to the action deposit the user can make the determination that the material Boron is not a deposit material. Corrections may then be made using the edit capability described hereinabove. It must be noted that the only relationship displayed is to the selected atomic component. No relationship between the two remaining components is implied. The Process Type Quick Reference GUIs 1o–1q are selected from the Process Type Display GUI 1i and do not provide any redundant create, edit, or delete capabilities.

Three GUIs make up the Process Type Quick Reference GUIs 1o–1q, an Action Reference GUI 1o, shown in more detail in FIG. 5, a Material References GUI 1p, shown in more detail in FIG. 6, and a Technology Reference GUI 1q, shown in more detail in FIG. 7. FIGS. 5–7 are further described hereinbelow. The Process Type Quick Reference GUIs 1o–1q display a selected atomic component (e.g. Action=Implant) and two lists showing all associated instances of the other manufacturing components (e.g. a list of Materials and a list of Technologies associated with the selected Action).

Each of the Process Type Quick Reference GUIs 1o–1q support the following operations:

a. Step Up/Down through the selected component b. Execute a new component selection c. Cancel the current user interface activity Turning now to a more detailed description of each of the GUIs shown in FIGS. 2–9, FIG. 2 shows the Process Type Main Interface GUI 1r which enables the user to select the activity desired via radio buttons 2a through 2f. The selected option is executed by selecting the Execute button 2g.

Selecting "Process Type" 2a displays the Process Type GUI shown in FIG. 3, giving the user the capability to create/edit the process types.

Figure 2:
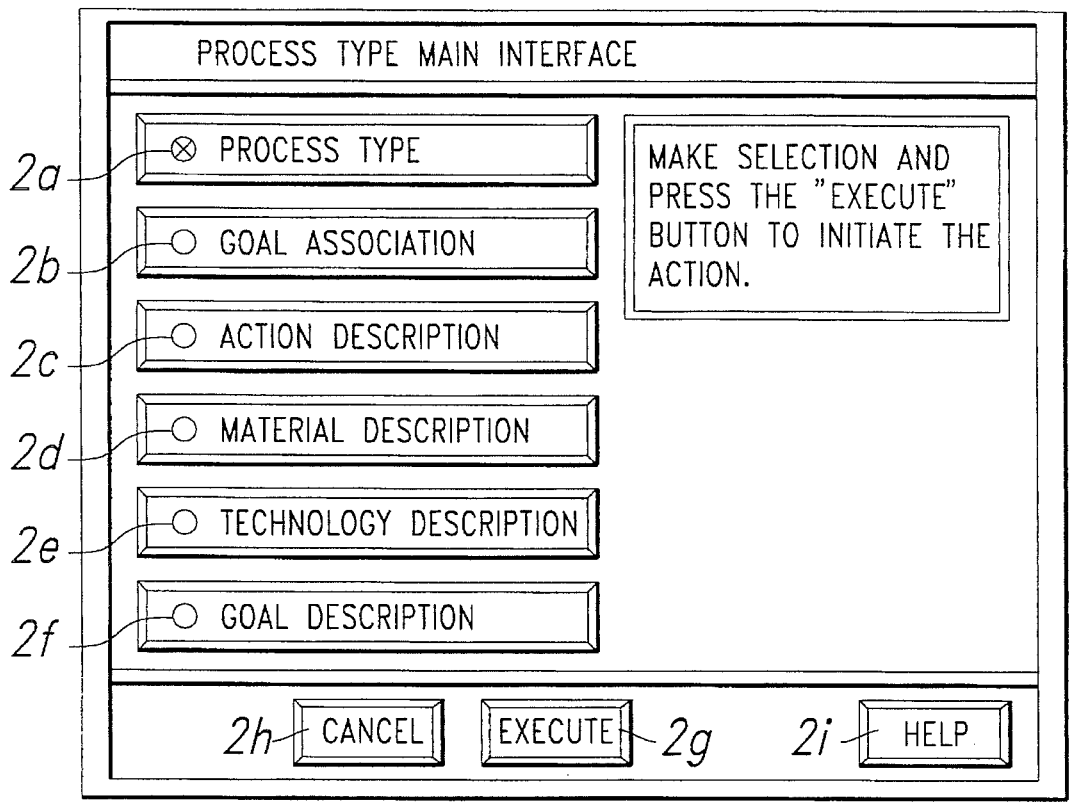
FIG. 2 depicts an exemplary Process Type Main GUI.

Selecting "Goal Association" 2b in FIG. 2 presents the user with the Goal Association GUI shown in FIG. 8 which allows creation, editing, and deletion of goal associated with the process type.

Selecting "Action Description" 2c allows the user to create a new action or edit the description of an existing action via the Action Display GUI shown in FIG. 12.

The user may create new or edit existing material descriptions by selecting "Material Description" 2d. The Material Display GUI supporting this capability is shown in FIG. 14.

Selecting "Technology Description" 2e enables the user to create or edit technology descriptions using the Technology Display GUI shown in FIG. 16. Selecting "Goal Description" 2f displays the Goal Description Display GUI shown in FIG. 18 and allows the user to add new goals, edit existing goals, delete goals, and describe how derived goals are calculated.

The Process Type Display GUI, shown in FIG. 3, is displayed when the user selects "Process Type" 2a on the Process Type Main Interface GUI, FIG. 2, and pushes the Execute button 2g. The information shown at 3h in FIG. 3 may be sorted in alphabetical order by the action, material, or technology component by selecting one of the radio buttons 3a through 3c, respectively. The default sorting is by the action component of the process type.

The display 3h is organized in rows and columns. Each row displays a process type as defined by its action, material, and technology components.

A process type may be selected by clicking on any one of its components using the pointing device 18. The scroll bar 3i allows the user to view rows further up or down on the display 3h.

The Create button 3d facilitates the creation of a new process type. When the Create button 3d is selected, the Process Type Create & Edit GUI shown in FIG. 4 is displayed to the user and a dialog is initiated allowing the user to enter or select the manufacturing components comprising the new process type.

Figure 4:
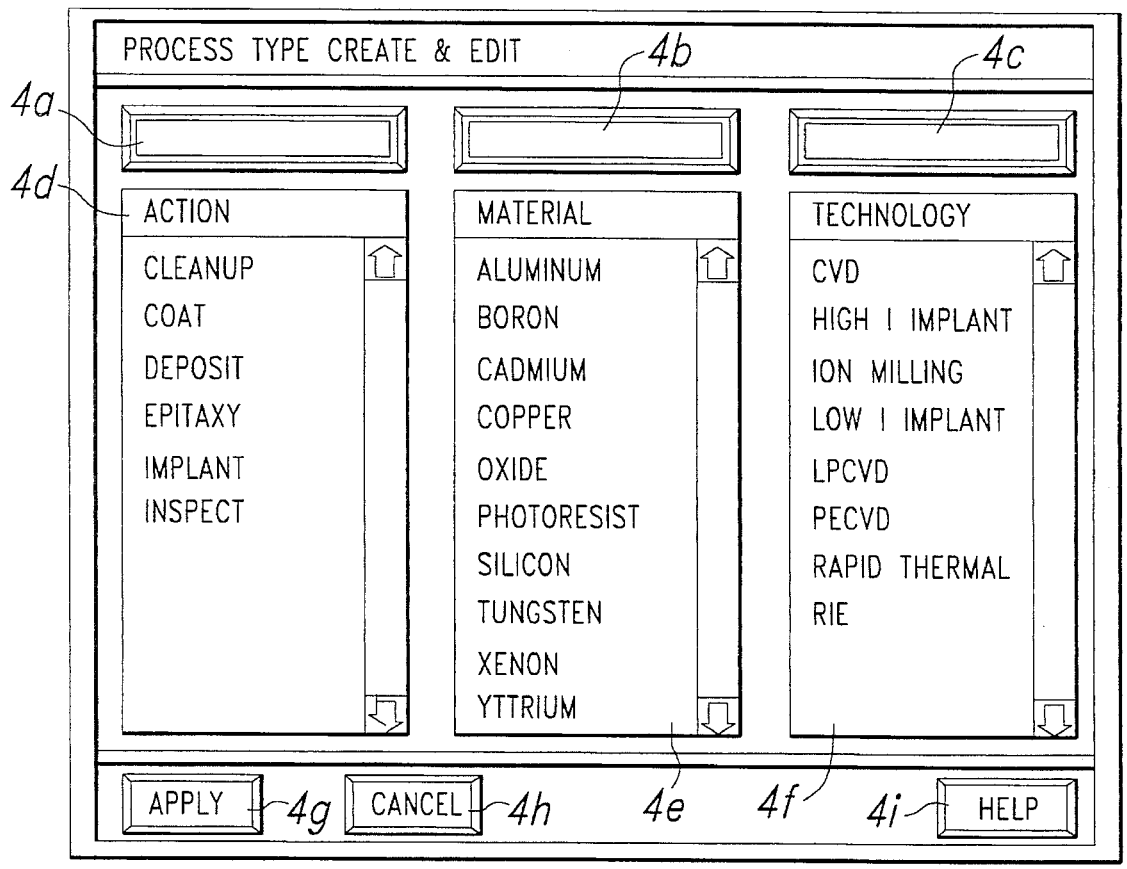
FIG. 4 is an exemplary Process Type Create & Edit GUI.

Selecting a process type (row) in FIG. 3 and pressing the Edit button 3e also presents to the user GUI shown in FIG. 4, except that the process type components are displayed at 4a, 4b, and 4c. The user can then make changes to any or all of the displayed components.

Process types selected in FIG. 3 are deleted by pressing the Delete button 3f. The user is prompted, via a dialog box, not shown, for a confirmation prior to the actual deletion of the process type.

The Review button 3g allows the user to inspect and maintain the process type components and their applicability to other components as shown in FIGS. 5, 6, and 7, described in detail hereinbelow.

The Process Type Create & Edit GUI shown in FIG. 4 is used to define a new process type by selecting or entering the action, material, and technology components which compromise the new process type, or to change the action, material, and technology components of an existing process type. Selecting the Apply button 4g accepts the combination currently displayed in the input fields 4a, 4b, and 4c and adds it to the process type library. Further processing upon selection of the Apply button 4g is also done to ensure that the selected combination of manufacturing components is not a duplication of an existing process type. The user is notified if the combination is a duplicate and the attempted creation of the duplicate process type is denied.

The user may enter the action, material, and/or technology directly into the respective input field 4a through 4c, or select one or all of the component(s) from the lists 4d through 4f displayed below the input fields 4a through 4c using the pointing device 18. Any selected components will appear in the respective input field 4a, 4b, or 4c, replacing any current content. Any action, material or technology component entered directly into the input fields 4a, 4b, or 4c, respectively, must exist in the library before it is accepted. The process type must specify at least an action component and a material component to be valid. If a technology component is not specified, the CIM applications will select a technology based on the available specifications at the time the process step represented by the process type is performed.

The user may view a list of material components 5c and a list of technology components 5d associated with the selected action component 5b using the Action References GUI shown in FIG. 5. These cross reference lists are useful in maintaining consistency in the process type information. From the exemplary information shown in FIG. 5, for example, the user may make the determination that Tin, listed as a material in 5c, is not applicable to the action "Implant" shown in the action field 5b. The user must then return, for example, to the Action Create & Edit GUI shown in FIG. 13 to remove the association.

Step buttons 5a associated with the action field 5b provide a mechanism to step up or down through the available action components. The material and technology components lists 5c and 5d are updated in response to reflect to the currently displayed action component shown in the action field 5b. The user may enter one or more characters spelling out an action into the action field 5b and the closest matching action component based on the characters entered is selected. The first matching action component is selected if multiple matches are detected. For example, entering on 'E' causes the selection of 'Etch', and following the 'E' with an 'X' causes the selection of "Expose". Invalid entries, such as entering a 'K' when no selection starts with 'K', are not accepted and, as an example, an audible alarm is sounded notifying the user.

The only relationship between the displayed material components in the materials component list 5c and the technology components in the technology component list 5d is that the displayed material components in the material component list 5c and the displayed technology components in the technology component list 5d can be associated with the currently selected action component in the action field 5b. Selecting a material component from the material component list 5c or a technology component from the technology component list 5d by clicking on a line item presents the GUI shown in FIG. 6 or FIG. 7, respectively. The user may switch between the three Process Type Quick Reference GUIs it by simply selecting an item from the list of the desired component.

The Material reference GUI, shown in FIG. 6, and the Technology References GUI, shown in FIG. 7, operate similarly to the Action References GUI, shown in FIG. 5 and described hereinbelow.

A Goal is a desired change in the product state. For example, a Goal in a Process Type describing the action Implant may be to implant the selected material to a density of 0.005 units. Goals may be directly observable (measurable) or may be indirectly observed, i.e. derived, from other information available from the manufacturing processes.

The Goal description GUIs, shown in FIG. 8 and FIG. 9, provide the mechanism for a user with sufficient authorization to view, create, change, and delete the associations between goals and a specific process type action component, or a specific process type action component and process type material component combination. It is also contemplated that a goal may be associated with a specific process type action component, process type material component and process type technology component combination.

The Goal Association Display GUI in FIG. 8 depicts the display presented to the user when "Goal Association" 2b is selected and executed from the Process Type Main Interface GUI shown in FIG. 2.

Goals may be selected from a predefined list of goals displayed in the goals list 8e and associated with a process type action component selected from the action component list 8a, or associated with an action and material component combination by also selecting a material from the material component list 8c. Associating goals with an action component identifies all goals applicable to an action regardless of the material involved (e.g. "Deposit" (thickness, uniformity, . . . )). The ability to associate goals with an action and material component combination allows the specification of goals which are dependent on the material involved (e.g. "Deposit" "Aluminum" (sheet resistance, roughness, . . . )).

The action component list 8a shows all actions known to the manufacturing system. The user may select an action from the action component list 8a and the action appears in the read-only field 8b. The user may also select a material from the material component list 8c and the selected material is displayed in the read-only field 8d.

The goals list 8e shows all goals applicable to the selected action or action/material combination. If none are selected the goals list 8e is empty. Thus, the general action and the more specific action/material goals are identified along with the goals which have data sampling plans associated with them.

Selection of the Create or Edit button 8f and 8g displays the Goal Association Create & Edit GUI shown in FIG. 9 allowing the user to establish new or change existing associations. The goals are associated with the action component or action/material component combination selected and displayed in fields 8b and 8d at the time the Create button 8f or Edit button 8g is selected. The action component or action/material component combination selected is also displayed in 9a and 9b. FIG. 9 is discussed hereinbelow.

The Delete button h, in FIG. 8, is selected to remove an association. This means that the association between the selected goals shown in the goals list 8e and the action component or action/material component combination currently displayed in fields 8b and 8d will be deleted. A dialog box, not shown, prompts the user for confirmation prior to the actual deletion of the association.

Figure 10:
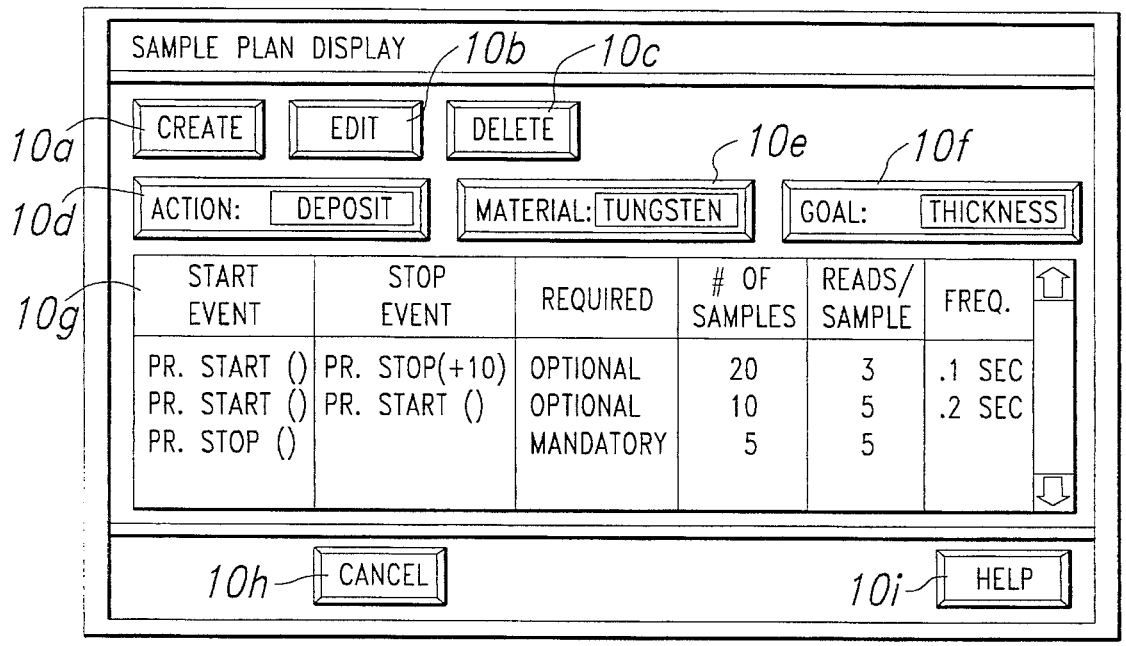
FIG. 10 is an exemplary Sample Plan Display GUI showing existing data sample plans for the action, material, and goal selected.

The Sample Plan button 9i, when selected, initiates the Sample Plan Display GUI shown in FIG. 10. The Sample Plan Display GUI shown in FIG. 10 allows the user to create new or edit existing data sampling parameters applicable to the action and material selected in fields 8b and 8d and the goal selected in list 8e. The Sample Plan button 9i is grayed out and not selectable unless both an action, and a material, are specified and a goal is selected from the list 8e. FIG. 10 is described in more detail hereinbelow.

The Goal Association Create & Edit GUI shown in FIG. 9 is used to select (deselect) goals and establish the association with an action, or action/material combination. The action is displayed in the read-only field 9a and the material is shown in 9b. The selected goals from list d are associated with the action or action/material combination shown in the read-only fields 9a and 9b.

The user may select goals from the list of available goals d by using the pointing device 18. If an undesired goal is selected, the user may simply deselect the goal using the pointing device 18. All selected goals will appear in the selected goals list 9c. The display of available goals will clearly identify the general and specific goals.

Selecting the Apply button 9e makes the association permanent by updating the object base entries with the current information. If an existing entry is replaced, the user is prompted to confirm the replacement. All associations are verified to determine whether any goals are common to all materials. If a goal common to all materials is found, the current embodiment of the present invention disassociates the common goal from the materials and instead associates the goal with an action. This procedure is performed automatically by the process type application software and is transparent to the user.

Each action/material/goal combination may be associated with a data sampling plan. The data sampling plan includes the parameters necessary for the equipment to perform the measurement(s). Sample parameters, as shown in the exemplary data sampling plan in FIG. 11, include the number of samples to take, the frequency of taking samples, the time to start taking samples, the time to stop taking samples, etc.

The Sample Plan Display GUI shown in FIG. 10 is displayed when the user selects the Sample Plan button i on the Goal Association Display GUI shown in FIG. 8. The Action, Material and Goal involved are displayed in fields 10d, 10e and 10f, respectively.

Figure 11:
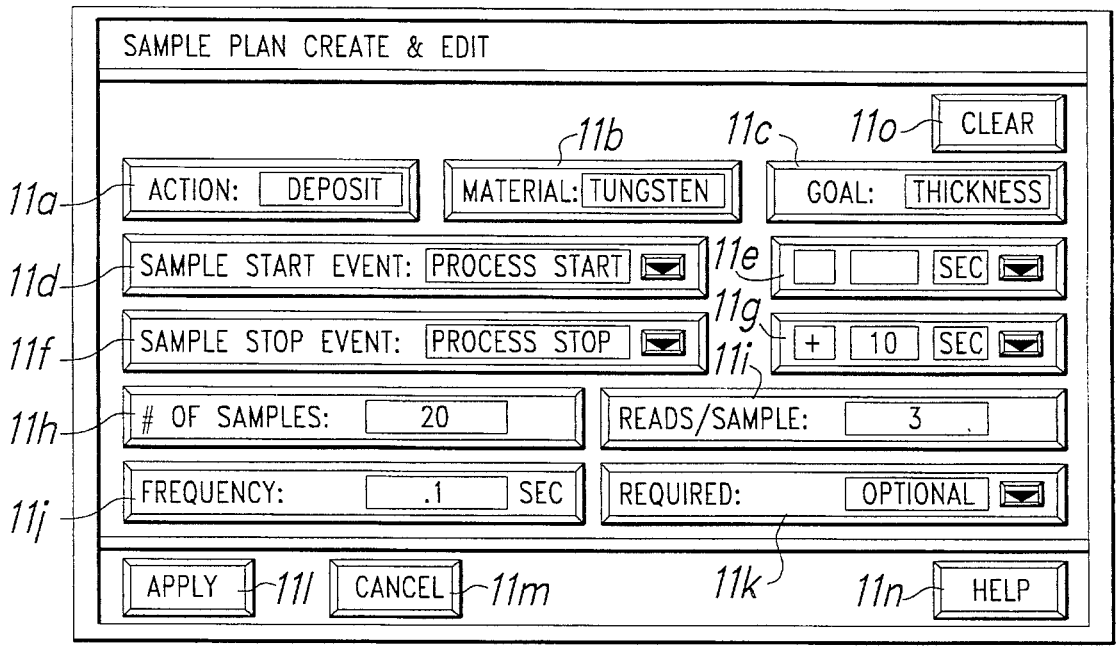
FIG. 11 depicts an exemplary Sample Plan Create & Edit GUI used to create or edit a data sample plan.

Selection of the Create button 10a displays the GUI shown in FIG. 11 allowing the user to describe a new data sampling plan.

The Edit button 10b is unselectable unless a data sampling plan is selected from the list at 10g. The user may select any data sampling plan description from the list at 10g describing the sampling plan using the pointing device 18. Selecting the Edit button 10b displays the GUI shown in FIG. 11 with the input fields 11a–11k filled in with the selected data sample plan parameter values. The Delete button 10c is active anytime after a data sampling plan description is selected. The user may remove a data sampling plan from the library by selecting the Delete button 10c. A dialog box, not shown, prompts the user for confirmation prior to the actual deletion of the data sampling plan.

The Sample Plan Create & Edit GUI shown in FIG. 11 is used to specify the various parameters required for the data sampling and data collection.

The Action, Material, Goal fields 11a, 11b and 11c and the input fields 11d through 11k are filled in from the items displayed and selected in FIG. 10 at the time the Edit button 10b is selected. The selection fields 11d, 11e, 11f, and 11g show the default selections and are changed by browsing through the available options using the pointing device 18 to activate spin buttons in 11d through 11g or by entering a value in one of the input fields 11d through 11k.

The user may clear all specification input fields 11d through 11k by selecting the Clear button 11o.

The sampling time for continuous sampling may be specified via the Sample Start Event field 11d and the Sample Stop Event field 11f, in conjunction with the specific time duration fields 11e and 11g. Examples of events in an exemplary semiconductor manufacturing environment include: chamber closed, processing started, processing ended, and chamber opened.

The Sample Start/Stop Events field 11d and 11f, the specific time duration fields 11e and 11g, and time units (seconds, minutes, hours) may be selected by clicking through the available options. The Sample Start Event field 11d and Sample Stop Event field 11f are optional and explicitly specified as "None" when they are not required. This allows the execution of data sampling to take place anytime before or after an event. The specific time duration fields 11e and 11g for single event specifications are not applicable and an error notification is generated and presented to the user if an attempt is made to apply single event specifications.

The following examples illustrate the usage of the optional Sample Event fields.

EXAMPLE 1

To specify that the material thickness is to be measured before the process step is performed, set the Sample Start Event to "None" and the Sample Stop Event to "Process Start" with no time specification. This is interpreted by the system as perform the measurement(s) anytime before the Sample Stop Event (Process Start), if necessary, by inserting a metrology step.

EXAMPLE 2

To measure the material thickness after the process step is performed, set the Sample Start Event to "Process Stop" with no time specification and the Sample Event Stop to "None". The system will interpret this as perform the measurement(s) anytime after the process step has been performed, if necessary by appending a metrology step.

The # of Samples 11h allows the specification of how many samples are to be taken. This is the maximum number. A process step taking 10 seconds and the sample frequency set to 1 per second, would result in ten samples even if the number of samples is set to 20. The reserved word "all" can be entered in the field 11h to indicate that every data sample is collected.

The Reads/Sample 11i specifies the number of time a reading is to be taken at the same point. This is useful to determine any error in the sensor(s) used for the measurement.

The Frequency 11j may be used to obtain evenly time spaced measurements. As noted above, the frequency multiplied by the number of samples will not override the processing time.

The user may also specify whether a sample is Mandatory or Optional 11k by clicking through the available options. Optional measurements will not be taken, unless the selected equipment is capable of doing so. Mandatory measurements will result in a metrology step being inserted prior to or appended after the current process step, unless the equipment is capable of performing the measurement itself.

The Apply button 11*l* is used to commit the data sampling plan information to the library of sample plans associated with the process types. All fields must be filled in for the apply to take place. A dialog box will inform the user if any required field does not have data entered.

The GUI shown in FIG. 12 displays a list 12*a* of all actions currently known to the system.

The Create button 12*b* will take the user to the GUI shown in FIG. 13. The input fields in FIG. 13 will be empty.

The Edit button 12*c* is grayed out unless an action is selected from the list 12*a*. With an action selected the Edit button will display the GUI shown in FIG. 13 with the input fields filled in with the information applicable to the selected action.

The Delete button 12*d* is grayed out unless an action is selected from list 12*a*. With an action selected the Delete button will remove the action description from the library, after prompting the user for a confirmation via a dialog box.

The Action Create & Edit GUI is shown in FIG. 13. The input fields are filled in if the user selected an action and pressed the Edit button 12*c* in FIG. 12. If the Create button 12*b* was pressed the input fields will be empty. In either case the user may make whatever changes are required in the input fields.

The Clear button 13*a* is available to clear any information in the input fields.

The input field associated with the action 13*b* is mandatory, while the abbreviation 13*c* and comment 13*d* input fields are optional.

The Apply button 13*e* is used to take the information in the input fields and apply them to the library of action components. The user is informed if the action already exists in the library and given the option to replace it. The dialog box used will show the existing action information.

The Material Display GUI shown in FIG. 14 displays the current material component information known to the system in the list 14*a*. The user may select any material by clicking on the line of the Material Display GUI shown in FIG. 14 which includes the material component.

The Create button 14*b* is used to display the Material Create & Edit GUI shown in FIG. 15, with the fields empty, allowing the user to enter information for a new material component.

The Edit button 14*c* is only active if a material is selected. Pushing the Edit button will display the Material Create & Edit GUI shown in FIG. 15, with the fields filled in, to allow the user to make any desired changes.

The Delete button 14*d* is grayed out unless a material component is selected. When it is active, it will remove the selected material component from the library, after prompting the user for a confirmation via a dialog box.

The Material Create & Edit GUI shown in FIG. 15 is used to enter new or modify existing material component information. The input field 15*a* naming the material is required, while the remaining input fields are optional.

Selecting the Clear button 15*e* removes all information from the input fields, providing the user with an empty template.

Selecting the Apply button 15*f* adds the material component information to the library. A check is performed to assure that the material component is not a duplicate. If a duplicate condition exists the user is shown the existing information via a dialog box, not shown, and given the option to replace the existing material component information.

The Technology Display GUI shown in FIG. 16 displays a list 16*a* of all technology components currently available to the system applications.

Figure 17:
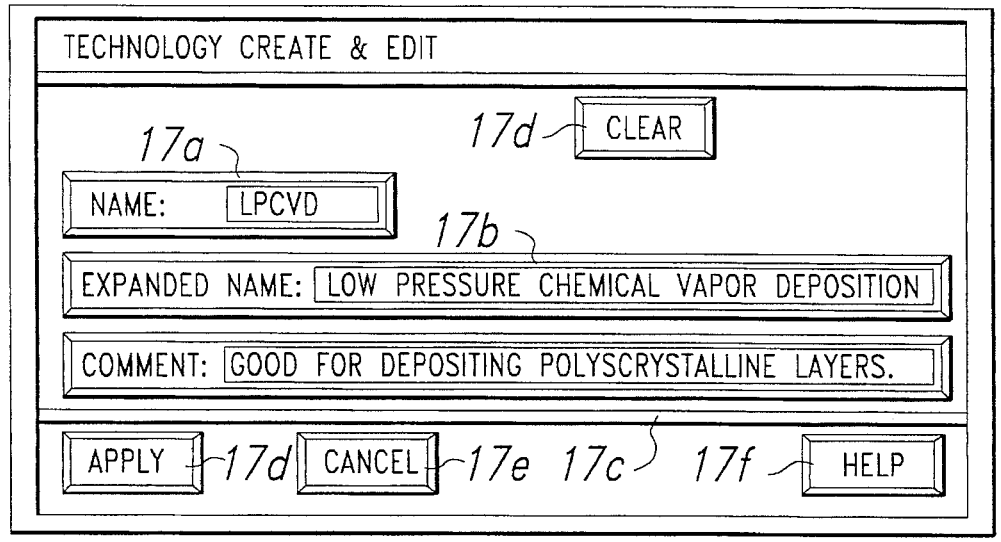
FIG. 17 is an exemplary Technology Create & Edit GUI available to create or edit technology component descriptions.

The Create button 16*b* is used to display the Technology Create & Edit GUI shown in FIG. 17, with the input fields empty, allowing the user to enter the information for a new technology component.

The Edit button 16*c* is only active if a technology component is selected and is used to display the Technology Create & Edit GUI shown in FIG. 17, with the input fields filled in, to allow the user to make any desired changes.

The Delete button 16*d* in FIG. 16 is grayed out unless a technology component is selected. When the Delete button 16*d* is active, selection of the Delete button 16*d* removes the selected technology component information from the library, after prompting the user for a confirmation via a dialog box, not shown.

The Technology Create & Edit GUI shown in FIG. 17 is used to enter new or modify existing technology information. The input fields naming the technology component, Name 17*a* and Expanded Name 17*b*, are required, while the Comment field 17*c* is optional.

The Clear button 17*d* removes all information from the input fields, providing the user with an empty template.

Selecting the Apply button 17*d* adds the technology component information to the library. A check is performed to assure that the technology component is not a duplicate. If a duplicate condition exists the user is shown the existing technology component information via a dialog box, not shown, and given the option to replace the existing technology component information.

The following describes the user interface allowing the description of process goals, i.e. goals which have been associated with an action, action/material or action/material/technology combination. The attributes of a process goal consist of the name, unit of measure, and the equation needed to derive goals which are not measurable, i.e. are not directly observable. The GUI described herein use this information to generate the required data sampling plans.

Figure 18:
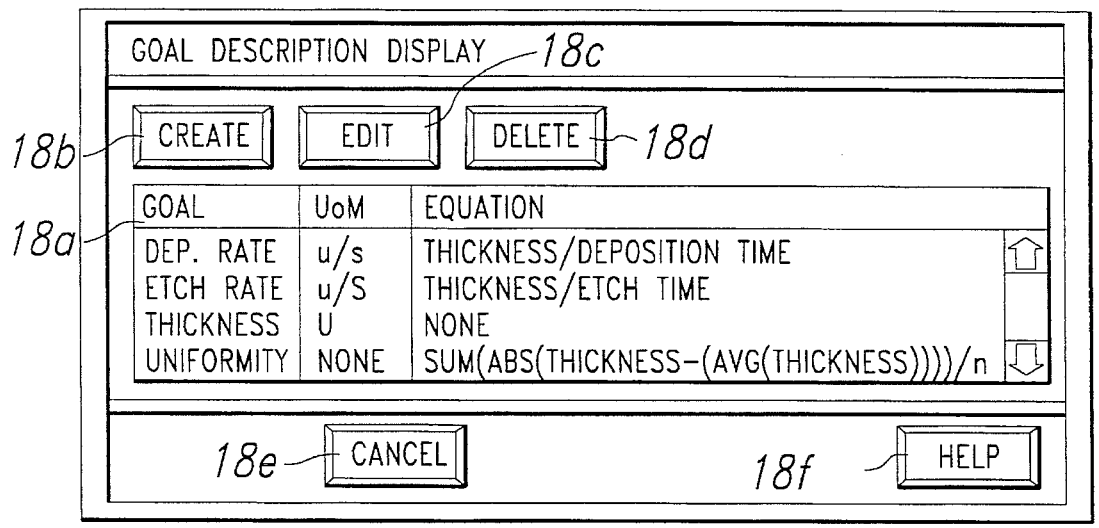
FIG. 18 shows an exemplary Goal Description Display GUI which shows a more detailed description of the goal/constraint components.

The goals and their calculation method are shown in the Goal Description Display shown in FIG. 18. Goals are selected by clicking on the desired line item in the goals list 18*a*.

The user may click on the Create button 18*b* to describe how a new goal is to be measured or derived. The user is then presented the Goal Description Create & Edit GUI shown in FIG. 19.

The Edit button 18*c* is grayed out unless a goal is selected. When a goal is selected and the Edit button 18*c* is activated, the user is presented with the Goal Description Create & Edit GUI shown in FIG. 19, with the selected goal component information in the input fields.

The Delete button 18*d* is grayed out unless a goal is selected. If a goal is selected, activation of the Delete button 18*d* removes the selected line item (equation) from the library. A dialog box, not shown, prompts the user for a confirmation prior to deleting the selected item.

The Goal Description Create & Edit GUI shown in FIG. 19 is available to describe how a goal, which is not directly measurable, is calculated. Goals which are directly measurable do not have calculations associated with them. Each variable used on the right side of the equation must be measurable or derivable.

If the Goal Description Create & Edit GUI is displayed in response to the Create button 18*b* on FIG. 18, the input fields are empty. The input fields include the information describing the selected line item (goal) from FIG. 18 if the Edit button 18c is selected.

The input fields 19b, 19c and 19d are populated with items selected from the display lists 19e, 19f and 19g, with the item placed at the current cursor position in the input field or replacing the highlighted portion of the input field. In addition, the user may enter the information directly. Any information entered and applied will become part of the library of available goals.

The unit of measure field 19c is optional for derived goals. If it is not specified, the unit of measure is derived from the equation (e.g. Dep. Rate is u/s). Only one unit of measure per goal is allowed. Conversions are available to convert between units of measure (e.g. Angstrom <->micrometer). Information describing the accepted units of measure for a particular manufacturing facility, based on country or preference, are maintained and information sent in response to selected queries are automatically converted. It also contemplated that the equations can be solved in terms of a variable X, where X is one of the available variables which make up the equation so that any of the equations may be solved in terms of any of its variables.

Selection of the Clear button 19a clears the input fields and deselects any currently selected items (e.g. available goals, arithmetic operations, . . . ). All input or delete functions take effect at the current cursor position in the input field or replacing the highlighted portion.

Selection of the Apply button 19h is adds the current information in the selected display field to the library of known equations. A check is performed and the user is warned if a variable used in generating the equation is not available.

Figure 20:
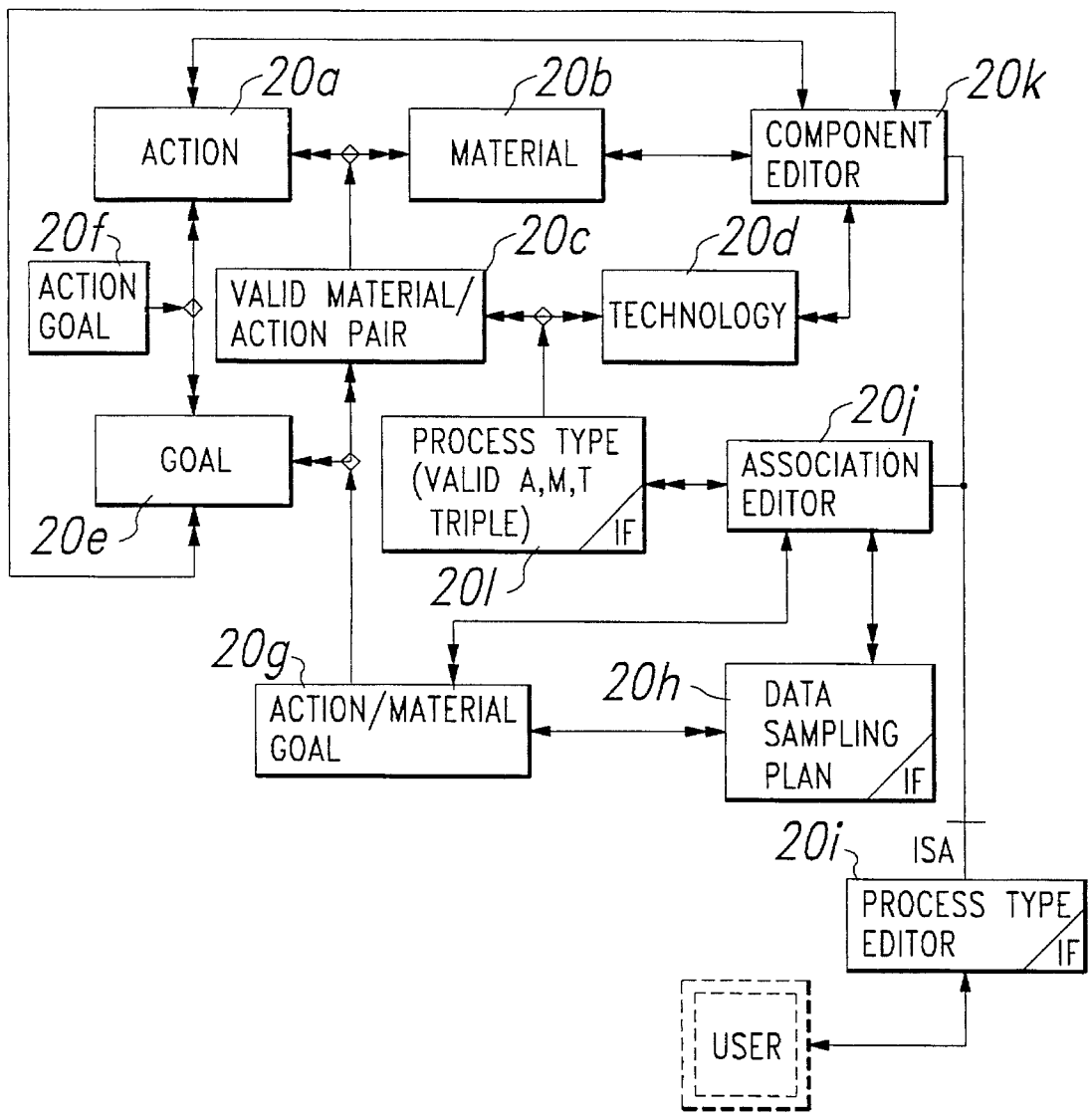
FIG. 20 is an exemplary information model depicting key objects and their relations in one embodiment of the present invention.

Turning now to a description of the processing elements of the present invention, the objects used in the current embodiment of the present invention and the object relationships are depicted in FIG. 20 in an information model using a notation based on Schlaer-Mellor notations as described in the textbook *Object Oriented Systems Analysis: Modeling the World in Data* by Sally Schlaer and Stephen J. Mellor and published by Yourdon Press in 1988, herein incorporated by reference in its entirety. Only certain, exemplary associative objects are shown. The symbol "IF", shown in object elements 20d, 20h and 20i, denotes objects which interface with other CIM applications or other users. The diagram in FIG. 20 depicts one of several possible implementations of the concepts described in this invention. A general description of the attributes and their usage in the current embodiment of the present invention are also given hereinbelow.

An Action 20a is a required object element of the Process Type in the current embodiment of the present invention. Examples of actions in a wafer fab include remove, deposit, epitaxy, and implant. Each Action 20a has an expanded name, and abbreviation, and an optional comment. Actions have a many-to-many relationship with materials. Actions 20a may also be associated with one or more Goals 20e. An authorized user may change, create, and delete individual Actions 20a using the Component Editor 20k.

A Material 20b is also a required component element of the Process Type in the current embodiment of the present invention. Examples of materials in a wafer fab include Aluminum, Boron, Copper, Oxide, Photoresist, and Nitride. Each Material 20b has a name, a chemical symbol, a type, a melting point, and a comment. Other physical properties may be included as attributes. Materials 20b have a many-to-many relationship with Actions 20a. An authorized user may change, create, and delete individual Materials 20b using the Component Editor 20k.

The Action 20a and Material 20b components are associated to form a Valid Material/Action Pair 20c, the two essential specified components of a Process Type. The Valid Material/Action Pair 20c is then associated with an available Goal 20e to form an Action/Material/Goal 20g.

A Technology 20d is also a component of the Process Type, which, if not specified, is selected by the CIM applications at the time the process step is performed. For some Process Types, such as a Process Type describing a metrology step in the exemplary semiconductor processing operation, the Technology 20d component may not be specified by the user. Examples of technologies in the wafer fab include chemical vapor deposition, reactive ion etch, and rapid thermal process.

Each Technology 20d has a name, an abbreviation and a comment attribute. An authorized user may change, create, and delete individual Technologies 20d using the Component Editor 20k.

Process Types 20d are established by associating a Valid Material/Action Pair 20c with a Technology 20d in a valid triple. In some cases, such as a metrology step, the Technology 20d component may not be specified by the user. An authorized user may change, add, or delete Process Types using the Association Editor 20j. This Association Editor 20j is also operable to interface with other manufacturing applications.

A Goal 20e is a desired result from a processing step. An authorized user may create, change or delete Goals 20e using the Component Editor 20k. Examples of goals include, thickness, uniformity, grain size, and resistivity. A Goal 20e may be associated with a Valid Material/Action Pair 20c by a user, thus specifying that a particular Goal 20e is desired for that Process Type regardless of technology used. Some goals may be common to all materials associated with an action, and thus generate an Action/Goal 20f object component. Goals 20e may be directly or indirectly measurable given a specific facility's capability.

A Goal 20e is directly measurable (i.e., a Direct Goal) if it is measurable by some sensor or piece of factory equipment. A Goal 20e is derived (i.e., an Indirect Goal) if it cannot be directly measured in the facility, but must be calculated based on other goals which are directly measurable. For example, uniformity is generally calculated by using a number of thickness measurements.

An Action Goal 20f is an available goal which has been associated with all materials applicable to a particular action. Action Goals 20f are not directly manipulatable by a user, but are automatically extracted from sets of Action/Material/Goals 20g.

An Action/Material Goal 20g is an available Goal 20e which is associated with a Valid Material/Action Pair 20c by an authorized user utilizing the Association Editor 20j. There may be more than one Goal 20e associated with any given Valid Material/Action Pair 20c. An Action/Material Goal 20g is associated with one or more Data Sampling Plans 20h.

It is contemplated that Action/Material/Technology Goals could also be included in one embodiment of the present invention.

A Data Sampling Plan (DSP) 20h includes the information required to describe a measurement process for a Goal 20e. The Goal 20e must be associated with a Valid Material/

Action Pair 20c before a DSP 20h can be specified by an authorized user utilizing the Association Editor 20j. A DSP 20h specifies start and stop events, number of samples taken, sample frequency and whether or not the plan is mandatory.

The Process Type Editor 20i supports high level editing commands common to all of the GUIs used in the current embodiment of the present invention. The Process Type Editor 20i also provides the Process Type Main GUI, shown in FIG. 2, for making main interface selections.

The Association Editor 20j and the Component Editor 20k are specializations of the Process Type Editor 20i. They are specialized to deal with the commands unique to the associations of process type components and editing components respectively.

Figure 21:
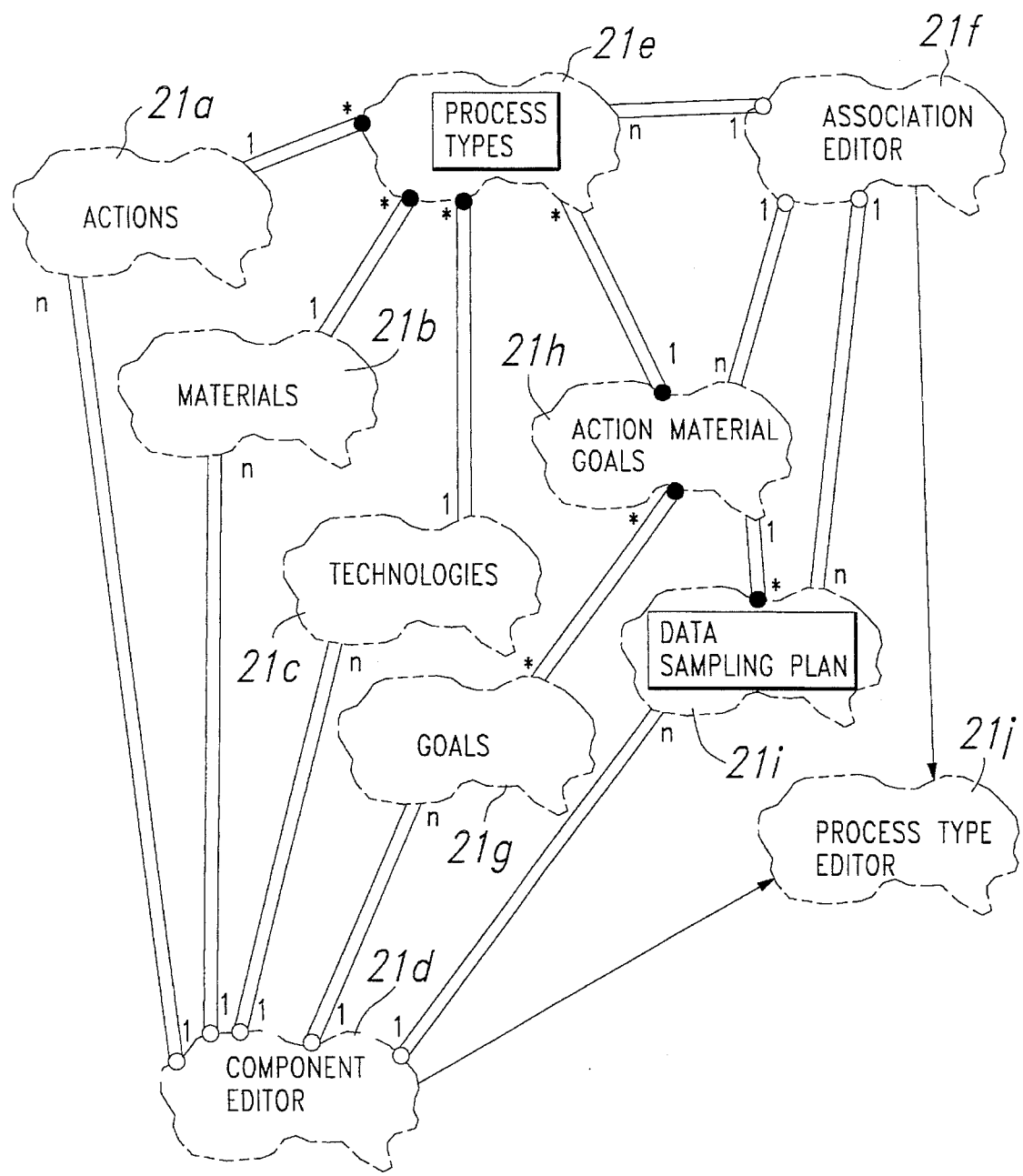
FIG. 21 shows an exemplary class diagram of one embodiment of the present invention.

A class diagram describing the current embodiment of the present invention is shown in FIG. 21. The class diagram shown in FIG. 11 uses the notation presented by Grady Booch in the book *Object-Oriented Design with Applications* published in 1991 by The Benjamin/Cummings Publishing Company, Inc. and herein incorporated by reference in its entirety.

Actions 21a, Materials 21b, and Technologies 21c are classes used to instantiate the components of the Process Type 21e. These classes are private to the process type application. The Component Editor 21d class contains the processing to edit, add, or delete the various components. The attributes of these components are used to build an object base for validity checks. For example, a material is associated with the chemical reactions which can be used to create it in a processing step.

A Process Type 21e is the class whose instances are used to generate a Process Type 20l from the component Actions 21a, Materials 21b and Technologies 21c. The Association Editor 21f is used to change, add, and delete the associations of actions, materials and technologies which make a Process Type 20e. The Process Type 20e class is visible to other applications and is operable to respond to requests for process type information, including all Valid Material/Action Pair objects 20c.

The Goal 21g object is the class whose instances are used to generate the available list of goals and their attributes, including computation formulas. This class is private to the Process Type application. The Component Editor 21d is used to change, add or delete available goals.

Action/Material/Goals 21h is the class whose instances are used to associate a Valid Material/Action Pairs 20c with an available Goal 20a. The Association Editor 21f is used to change, create, and delete the associations which generate an Action/Material Goal 21h.

Data Sampling Plan 21i provides the class whose instances are a data sampling plan associated with an Action/Material Goal 21n. The Component Editor 21d is used to enter a particular data sampling plan. The Data Sampling Plan 21h class is accessible by other applications and returns a specific data sampling plan or set of data sampling plans in response to queries from the other applications.

The Process Type Editor 21j class provides common editing functions, such as cancel, edit, apply, and delete, to the other editors. Functions common to editing associations of objects are separated from functions common to editing component information.

State transition diagrams are not shown for these classes, since none participate in a significant, independent thread of control, i.e., a separate processing transaction is not generated for these classes. Rather, all process type classes use the inquirer's thread of control to answer queries. The thread of control associated with maintenance of the Process Type classes 21e is primarily associated with object base transactions.

Figure 22:
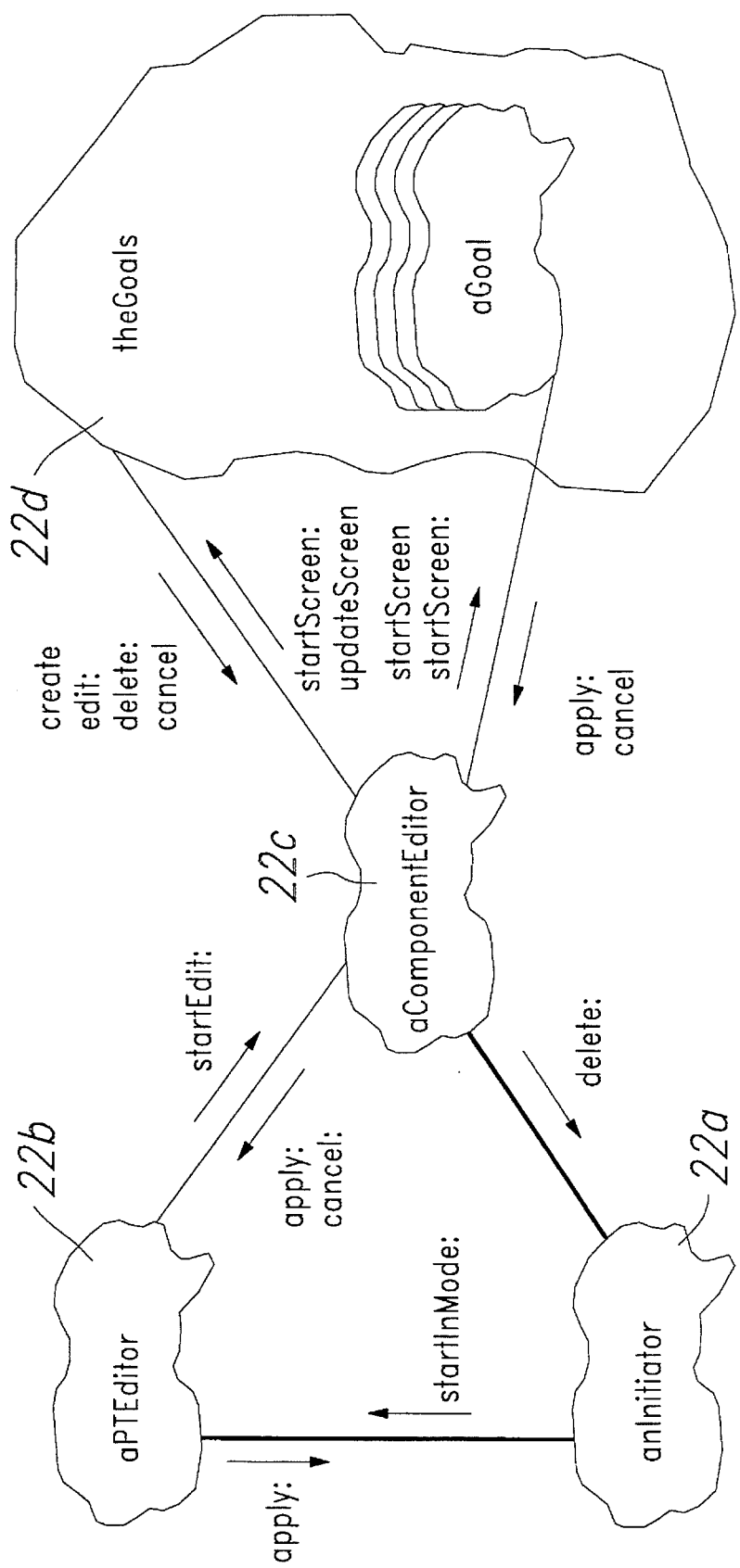
FIG. 22 shows an exemplary object diagram of one embodiment of the present invention.

FIG. 22 describes mechanisms used in the current embodiment of the present invention.

An authorized user may create, change or delete a process type component (Action, Material, Technology, or Goal) utilizing the Component Editor 22c. The changes made are temporary until an "apply:" message is invoked, or until the "delete:" command is confirmed. The user may cancel changes instead of making them permanent by issuing the "cancel:" command. The "cancel:" command also returns the user to the invoking GUI upon completion.

The object diagram, based on Booch's notation, for the maintenance of the Goals component is shown in FIG. 22. Though the actual GUIs used and the arguments sent vary, the object diagrams for the other components are similar, and thus, not shown.

The anInitiator object 22a is external to the Process Type in the current embodiment of the present invention. It may be a user, or a testing class imitating a user. If the anInitiator object 22a is a test object, it will be operable to put aPTEditor object 22b into a testing mode, which allows the anInitiator object 22a to control changes to the object base. In a normal mode the "apply:" and "delete:" commands are not mediated.

The aPTEditor object 22b allows the user to select one of four components, or one of two associations to edit.

The aComponentEditor instance 22c starts the display GUI for the appropriate component. The component class, i.e., the Goals 22d class in FIG. 22, may send the aComponentEditor instance 22c any of four selectors, create, edit:, delete:, or cancel. The create or edit: messages will cause the aComponentEditor instance 22c to start the create/edit GUI for that component with the message start GUI or startGUI:. The appropriate Create & Edit GUI generates the apply: and cancel messages.

If the component display GUI is not directly dependent on the Create & Edit GUI, the aComponentEditor instance 22c updates the display GUI. The aComponentEditor instance 22c handles the delete: message if in a normal operating mode, otherwise the delete: message is passed through to the anInitiator object 22a. Likewise, the apply: message is handled by the aPTEditor object 22b in the normal operating mode, or passed to the anInitiator object 22a if in a testing mode.

The following messages are available for other applications to query the Process Type of the present invention for desired information:

"requestGoalsForProcess:"—Returns a collection of all goals associated (if any) with a named Action;

"requestGoalsForAction:forMaterial:"—Returns a collection of Goals associated, if any, with a named Action/Material pair;

"requestGoalsForAction:forMaterial:forTechnology:"—Returns a collection of Goals associated (if any) with a named Process Type;

"requestDSPsForAction:forMaterial:"—Returns a collection of DSPs associated (if any) with the named Action/Material Pair, ordered by associated Goal; and "requestDSPsForAction:forMaterial:forGoal:"—Returns a collection of DSPs associated (if any) with the named Action/Material/Goal association.

The examples shown in Appendix A serve to illustrate various types of Actions, Materials, and Technologies and are based on an exemplary semiconductor manufacturing facility. For each Action listed, a description is given with a listing of valid Materials and Technologies. The Materials are grouped by the standard technology used to affect a change in the material state. Goals associated with each Process Type are grouped in categories. The first category contains general Goals. The General Goals apply to all Materials and Technologies associated with that Action.

Using the Deposition example, the categories include: general, oxides/nitrites, doped oxides and metallic films. In the semiconductor industry it is necessary to list goals based on a material type. Continuing with the Deposition example, the goal of dielectric constant would apply to Si3N4 (silicone nitrite), but not to W (tungsten).

A set of Process Types for the semiconductor industry can be derived from the examples given in Appendix A. That set of Process Types includes: Deposition-Si3N4-LPCVD, Implant-Arsenic-High Current Implanter, and Etch-AlCu-Plasma. This set shows that to create a Process Type, the user would associate an Action with a Material and optionally with a Technology.

Although the present invention and its advantages have been described in detail, it should be understood that various changes, substitutions and alterations can be made herein without departing from the spirit and scope of the invention as defined by the appended claims.

APPENDIX A

| ACTION | TECHNOLOGY | MATERIAL |
|---|---|---|
| Deposition - is defined as a process for creating a material layer upon a wafer's surface. The material deposited in a wafer fabrication can be either metallic or non-metallic (oxides and glasses). | LPCVD | Si3N4 |
| | | PSG |
| | | a-Si |
| | | Poly-Si |
| | | W |
| | | TiN |
| | PECVD | Si3N4 |
| | Thermal | Si02 |
| | CVD | W |
| | | TiN |
| | Sputter | AlSi2 |
| | | Ti |
| | | AlCu |
| | | TiW |
| | PETEOS | Si02 |

GOALS

| General | Oxides/Nitrides | Doped Oxides | Metallic Films |
|---|---|---|---|
| Thickness | Pinhole Density | Resistivity | Sheet Resistance |
| Uniformity | Dopant | SIMS Dopant | Composition |
| Conformality | Concentration | Concentration | Roughness |
| Resistivity | Refractive Index | | Particles |
| Deposition Rate | Wet Etch Rate | | CV |
| Film Stress | Hydrogen Content | | Mobile Ion |
| Grain Size | Film Type: | | Concentration |
| | (Compressive | | |
| | or Tensile) | | |
| | Mobile Ion | | |
| | Concentration | | |
| | Breakdown Voltage | | |
| | Dielectric | | |
| | Constant | | |
| | Interface Trap | | |
| | Density | | |
| | Fixed Charge | | |
| | Trace | | |
| | Contaminants | | |
| | Stoichiometry | | |

| ACTION | TECHNOLOGY | MATERIAL |
|---|---|---|
| Epitaxy - growth of a crystalline layer of material whose lattice matches the bulk wafer's surface. If the layer to be grown differs in crystalline structure from the substrate, it is termed heteroepitaxy. | CVD | Si02 |
| | MBE | Si02 |

| General Goals |
|---|
| Thickness |
| Uniformity |
| Resistivity |

APPENDIX A-continued

Depth of Transition Layer
Film Quality

| ACTION | TECHNOLOGY | MATERIAL |
|---|---|---|
| Cleanup - cleanup techniques are used to remove material which can be either resist or particles that remain from prior processing. Cleanup techniques can be used to prepare a surface for another process (alter the surface state). | Acid Chemistry | Oxides of Silicon |
| | Solvent Chemistry | All Types of Resist |
| | Microwave Ash | All Types of Resist |
| | Plasma Ash | All Types of Resist |
| | Spin/Rinse | Particles (metallic/non-metallic) |
| | Megasonic | Particles (metallic/non-metallic) |

Goals

| General Goals | General Goals for Resist Removal |
|---|---|
| Thickness Particles Mobile Ion Concentration Breakdown Voltage E50 at BV50 Carrier Lifetime Etch Rate | Selectivity |

| ACTION | TECHNOLOGY | MATERIAL |
|---|---|---|
| Coat - the coat process is used to deposit resist on a wafer's surface. The resist is applied and then the wafer is spun evenly, distributing the resist across the surface. | Spin | Positive E-Beam DUV Negative |
| | Thick Film | Negative |

General Goals

Thickness
Uniformity

| ACTION | TECHNOLOGY | MATERIAL |
|---|---|---|
| Expose - the exposure process is used to illuminate the areas of resist producing a pattern. Because there is not a method which can measure the image imparted to the resist as a result of the illumination, there are no goals. The only information to be supplied by a user would be the mask number to use. | UV | Positive |
| | DUV | DUV Positive |
| | E-Beam | E-Beam |

| ACTION | TECHNOLOGY | MATERIAL |
|---|---|---|
| Develop - the develop process is used to "wash away" resist which had been exposed (for positive and e-beam resist) or the opposite for negative resist. What is left then is a pattern on the wafer in resist. | Spin | Positive E-Beam DUV Negative |
| | Plasma | Positive |

General Goals

Thickness
Uniformity
Profile
Critical Dimension

| ACTION | TECHNOLOGY | MATERIAL |
|---|---|---|
| Bake - the bake process is used to remove solvents from resist | UV Hard | Positive |

APPENDIX A-continued

| | | |
|---|---|---|
| after coat and develop. The bake step can alter the thickness, uniformity and profile of the resist depending upon the method, duration and temperature used. | Oven | Positive E-Beam DUV Negative |
| | Vacuum | Positive |

| ACTION | TECHNOLOGY | MATERIAL |
|---|---|---|
| Implant - this process is used to "inject" dopants into a wafer either enhancing or preventing conduction of current. The dopants provide the electrons that make up the current flow in an enhancement mode. | Implanter | Arsenic Boron Silicon |

General Goals

Sheet Resistance
Dopant Profile

| ACTION | TECHNOLOGY | MATERIAL |
|---|---|---|
| Diffusion - the diffusion process is used to move and distribute dopants within silicon layer. A diffusion process may also encompass the dopant deposition process prior to the diffusion. A furnace is used as hot-wall reactor providing a heat source. | Thermal | Si As B P |

General Goals

Dopant Profile
Sheet Resistance

| ACTION | TECHNOLOGY | MATERIAL |
|---|---|---|
| Oxidation - the oxidation process exposes the Si surface to an oxidizing ambient which may be oxygen or steam and oxygen. As the process proceeds, the Si from the wafer's surface is consumed to form the SiO2 layer. High temperature (700–1200° C.) is used to drive the reaction. To dope an oxide, a dopant is injected along with the ambient into the chamber. The addition of water vapor promotes the oxidation rate. | RTP (Thermal) Wet Anodization CVD Plasma Anodization | SiO2 SiO2 SiO2 SiO2 |

| | Goals | |
|---|---|---|
| General | | Thick Oxide |
| Thickness Thickness Uniformity Interface State Density Fixed Charge Mobile Ion Concentration Breakdown Voltage Charge to Breakdown | | Conformality Refractive Index Carbon Concentration Stoichiometry Hydrogen Content |

| ACTION | TECHNOLOGY | MATERIAL |
|---|---|---|
| Anneal - the anneal process is used to "repair" crystal damage due to implantation and drive dopants into silicon wafer. This process activates the dopant within the crystal. The anneal process is also used after crystal growth process. | Furnace RTA | Silicon Gallium Arsenide Silicon Gallium Arsenide |

APPENDIX A-continued

| General Goals |
|---|
| Sheet Resistance |
| Junction Depth Profile |
| Contact Resistance |
| Junction Leakage |
| Residual Defect Density |

| ACTION | TECHNOLOGY | MATERIAL |
|---|---|---|
| Alloy - the alloy process is used to "fuse" metallic material into bulk semiconductor by melting the metallic material and forcing it to diffuse into the bulk semiconductor material. | Furnace<br><br>RTA | Ni<br>Gold<br>Al<br>Ti |

| General Goals |
|---|
| Sheet Resistance |

| ACTION | TECHNOLOGY | MATERIAL |
|---|---|---|
| Etch - these processes are used to remove material; precise control over the amount of material removed and the resulting profile of the etched area is necessary for a well-controlled process. | Microwave<br><br><br>Plasma<br><br><br><br><br>Acid Solution<br>RIE<br>MERIE<br>VaporPhase | Si3N4<br>Oxide<br>PBL<br><br>CVD-W<br>Al—Cu<br>Poly-Si<br>Si3N4<br>TiSi2<br>SiO2<br><br><br>Thermal-Ox<br>Native-Ox<br>Chemical-Ox |

| Goals | |
|---|---|
| General | Oxides/Nitrides |
| Depth<br>Uniformity<br>Etch Profile<br>Selectivity<br>CD Line Loss<br>CD Uniformity<br>Etch Rate<br>Particles | Breakdown Voltage<br>Mobile Ion Concentration<br>Carrier Lifetime<br>Interface Trap Density |

| ACTION | TECHNOLOGY | MATERIAL |
|---|---|---|
| Planarization - the planarization process is used to smooth out surface for future processing. A smooth surface promotes better coverage of future layers, for instance, resist coating. There are two possible processes. The first involves doping a dielectric layer with boron and phosphorous, thus lowering its melting point. The dielectric layer is then heated causing it to reflow. The second process involves coating the wafer with resist and performing a blanket etch over the wafer. The etch rate of the resist and the dielectric being the same will promote the etching back of high topography structures. | HIPOX-Reflow<br><br>Etch-Back | BPSG<br><br>Resist/Dielectric |

APPENDIX A-continued

| General Goals |
| --- |
| Contact Chain Yield |

What is claimed is:

1. A method of establishing a generic set of process descriptions in a computer-aided process engineering system, said method executing on a computer, said computer including a memory, the method comprising:

storing a set of actions in said memory, each of said actions representing steps in a process described by one of said process descriptions;

storing a set of materials in said memory, each of said materials capable of being used with at least one of said actions;

storing a set of technologies in said memory, each of said technologies capable of being used with at least one of said materials to perform at least one of said actions;

repeatedly associating one of said actions with one of said materials to generate a plurality of first process types;

repeatedly associating one of said actions and one of said materials with one of said technologies to generate a plurality of second process types;

providing said first and second process types to said computer-aided process engineering system, said computer-aided process engineering system operable to control a machine operable to perform said process in accordance with said first and second process types to achieve a desired result.

2. The method of claim 1 further comprising the steps of:

storing a first set of goals in said memory, said first set of goals identifying goals applicable to said actions independent of said materials;

storing a second set of goals in said memory, said second set of goals identifying goals applicable to said actions and said materials independent of said technologies.

3. The method of claim 2 wherein said providing step further including the step of providing said first and second sets of goals to said computer-aided process engineering system, said computer-aided process engineering system operable to control said machine in accordance with said first and second process type to achieve said desired result, said desired result defined in terms of said first and second sets of goals.

4. The method of claim 2, wherein said first and second sets of goals include direct goals and indirect goals, further including the step of:

storing a first set of data sampling plans in said memory, each of said first set of data sampling plans including a set of calculations defining one of said indirect goals in terms of said direct goals, said direct goals measurable using certain equipment.

5. The method of claim 1 wherein said providing step further includes the step of providing said first set of process types to said computer-aided process engineering system, said computer-aided process engineering system operable to select one of said set of technologies to use with said one of said materials to perform said one of said actions at processing time.

6. An apparatus for establishing a generic set of process descriptions in a computer-aided process engineering system comprising:

means for defining actions to be performed in conjunction with a process described by one of said process descriptions;

means for designating a plurality of materials associated with each of said actions;

means for designating a plurality of technologies associated with each of said actions and each of said materials and operable to be used with said each of said materials to perform said each of said actions;

means for generating a first set of process types, said first set of process types associating one of said actions with one of said materials and for generating a second set of process types, said second set of process types associating one of said actions and one of said materials with one of said technologies; and means for providing said first and second sets of process types to said computer-aided process engineering system, said computer-aided process engineering system operable to control a machine to perform said process in accordance with said first and second sets of process types to achieve a desired result.

* * * * *